(12) United States Patent
Jung et al.

(10) Patent No.: US 9,201,235 B2
(45) Date of Patent: Dec. 1, 2015

(54) ELECTROWETTING DISPLAY DEVICE

(71) Applicant: Liquavista B.V., Eindhoven (NL)

(72) Inventors: Kwang-Chul Jung, Seongam-si (KR); JaeJin Lyu, Yongin-si (KR); Hyun Sup Lee, Suwon-si (KR); Meehye Jung, Suwon-si (KR)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/479,056

(22) Filed: Sep. 5, 2014

(65) Prior Publication Data

US 2014/0376079 A1    Dec. 25, 2014

Related U.S. Application Data

(63) Continuation of application No. 13/765,242, filed on Feb. 12, 2013, now Pat. No. 8,854,718.

(30) Foreign Application Priority Data

Aug. 28, 2012    (KR) .................. 10-2012-0094448

(51) Int. Cl.
*G02B 26/00* (2006.01)
*G02B 26/02* (2006.01)

(52) U.S. Cl.
CPC .................. *G02B 26/005* (2013.01)

(58) Field of Classification Search
USPC ........................ 359/290–300, 228
See application file for complete search history.

(56) References Cited

U.S. PATENT DOCUMENTS

| 7,746,540 | B2 | 6/2010 | Lo et al. | |
| 7,760,420 | B2* | 7/2010 | Cheng et al. | 359/297 |
| 7,847,996 | B2 | 12/2010 | Chen et al. | |
| 7,876,506 | B2 | 1/2011 | Chen et al. | |
| 7,940,445 | B2 | 5/2011 | Feil et al. | |
| 7,993,819 | B2 | 8/2011 | Lo et al. | |
| 8,059,328 | B1* | 11/2011 | Kuo et al. | 359/290 |
| 8,854,718 | B2* | 10/2014 | Jung et al. | 359/290 |
| 2006/0132927 | A1 | 6/2006 | Yoon | |
| 2008/0204370 | A1 | 8/2008 | Feenstra et al. | |
| 2009/0058840 | A1 | 3/2009 | Lee et al. | |
| 2010/0225611 | A1 | 9/2010 | Lee et al. | |
| 2014/0063586 | A1 | 3/2014 | Jung et al. | |

FOREIGN PATENT DOCUMENTS

| EP | 2071385 A1 | 6/2009 |
| KR | 1020080002201 A | 1/2008 |
| KR | 1020110071276 A | 6/2011 |
| KR | 1020110119978 A | 11/2011 |

OTHER PUBLICATIONS

Office Action for U.S. Appl. No. 13/765,242, mailed on Feb. 20, 2014, Kwang-chul Jung, "Electrowetting Display Device", 8 pages.

* cited by examiner

*Primary Examiner* — Mohammed Hasan
(74) *Attorney, Agent, or Firm* — Lee & Hayes, PLLC

(57) ABSTRACT

An electrowetting display device includes a plurality of pixels each including an array substrate, an opposite substrate, and an electrowetting layer. The array substrate includes a base substrate, a barrier wall defining a pixel area, a partition wall partitioning the pixel area into a plurality of sub-pixel areas, a hydrophobic layer disposed in the sub-pixel areas, and an electronic device controlling the electrowetting layer.

20 Claims, 16 Drawing Sheets

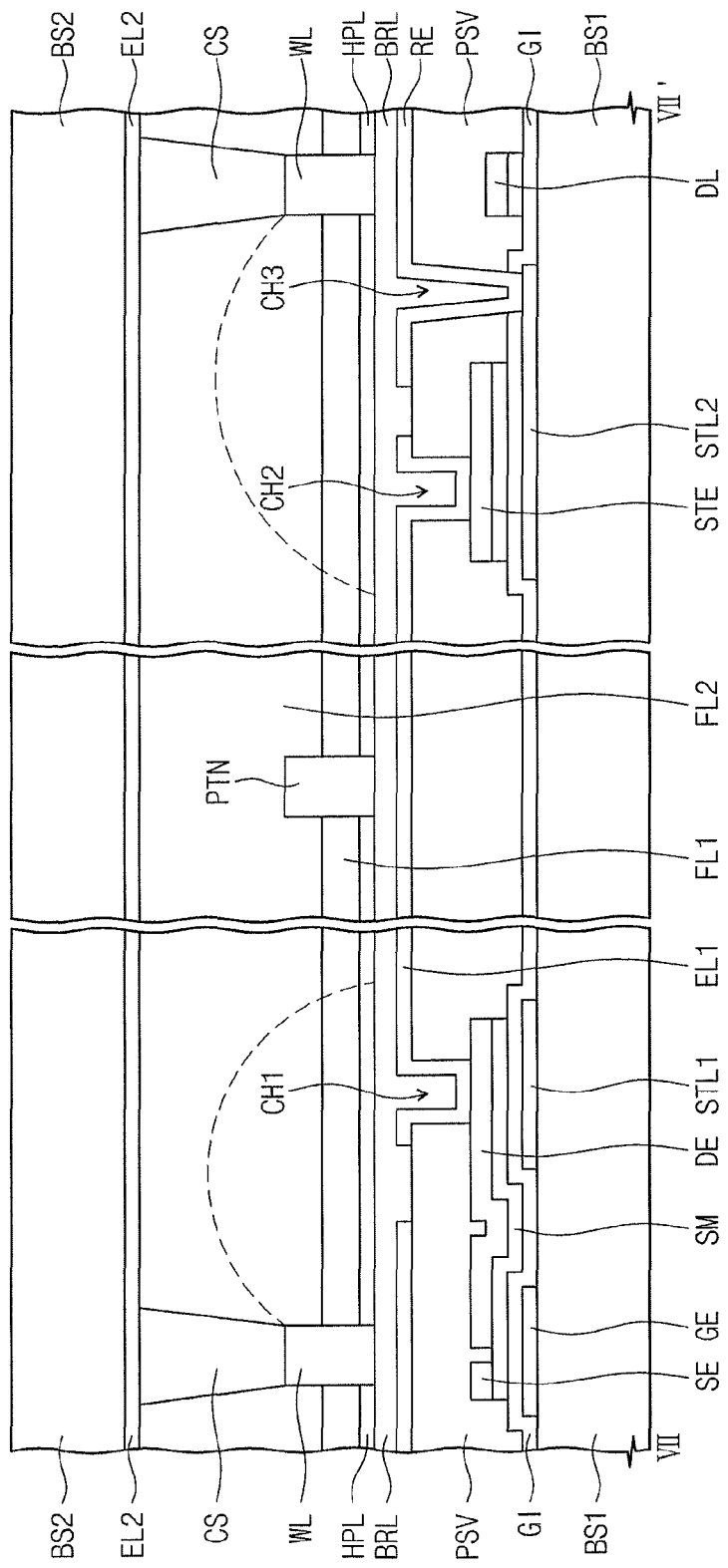

ELECTROWETTING DISPLAY DEVICE

CROSS-REFERENCE TO RELATED APPLICATION

This U.S. non-provisional patent application is a continuation of and claims priority to U.S. patent application Ser. No. 13/765,242, filed on Feb. 12, 2013 Now U.S. Pat. No. 8,854, 718 B2, that claims priority to and benefit of Korean Patent Application No. 10-2012-0094448, filed on Aug. 28, 2012 in the Korean Intellectual Property Office, the contents of which are incorporated herein by reference.

BACKGROUND

1. Field of the Invention

The present disclosure relates to an electrowetting display device using an electrowetting effect for changing displayed images.

2. Description of the Related Art

Various types of flat panel display devices, e.g., the liquid crystal display device, the plasma display device, the organic light emitting display, the field effect display device, the electrophoretic display device, the electrowetting display device, etc., have been widely used.

In general, an electrowetting display device may apply a voltage to a fluid, e.g., an aqueous liquid electrolyte, to change a surface tension of the fluid. Accordingly, the fluid may transmit or reflect light provided from an external source so as to display desired images.

SUMMARY

One or more embodiments of the invention may be related to an electrowetting display device that has satisfactorily high transmittance and satisfactorily fast response speed.

One or more embodiments of the invention may be related to an electrowetting display device that includes the following elements: a base substrate, a barrier wall disposed on the base substrate to define a pixel area, a partition wall that partitions the pixel area into a plurality of sub-pixel areas, a hydrophobic layer disposed in the sub-pixel areas, an electrowetting layer disposed in each of the sub-pixels and including a first fluid and a second fluid, which are immiscible with each other, and an electronic device disposed in the pixel area and configured for applying a voltage to the electrowetting layer to control the electrowetting layer. The second fluid has electrical conductivity and/or polarity.

The electrowetting display device further includes an opposite substrate overlapping the base substrate. The electronic device includes a switching device provided to correspond to the pixel area, a first electrode connected to the switching device and covering at least a portion of each of the sub-pixels, and a second electrode disposed on the opposite substrate and applied with a common voltage to generate an electric field in cooperation with the first electrode.

The electrowetting display device further includes a reference electrode disposed on the base substrate, spaced (and electrically insulated) from the first electrode, and applied with a reference voltage. The reference voltage has a same level as the common voltage. The reference electrode covers at least a portion of the switching device.

The pixel area includes a first sub-pixel area and a second sub-pixel area.

According to the above, the electrowetting display device may provide satisfactory display quality. The electrowetting display device may be manufactured using a simple and low-cost manufacturing process, so that manufacturing time and cost of the electrowetting display device maybe minimized.

BRIEF DESCRIPTION OF THE DRAWINGS

The above and other advantages of the present invention will become readily apparent by reference to the following detailed description when considered in conjunction with the accompanying drawings wherein:

FIG. 10B is a cross-sectional view taken along a line VII-VII' indicated in FIG. 10B.

DETAILED DESCRIPTION

Figure 1A:
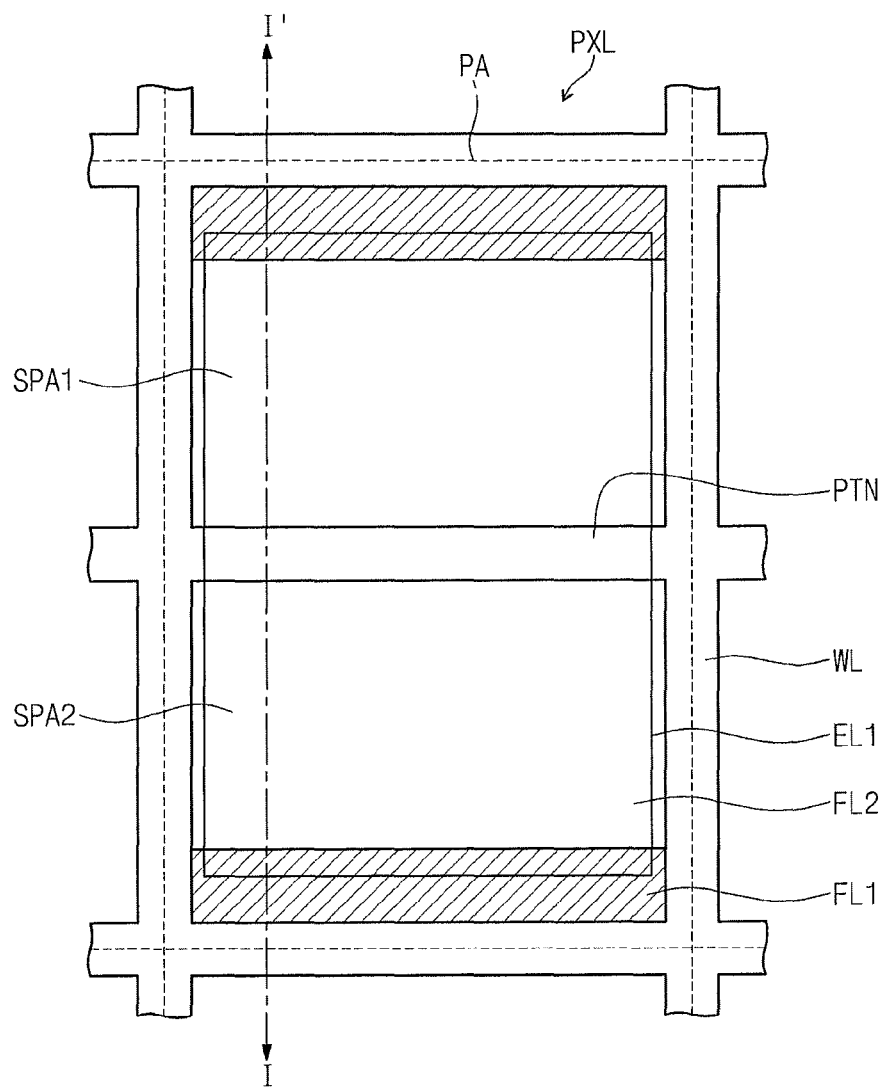
FIG. 1A is a plan view illustrating an electrowetting display device according to one or more embodiments of the present invention.

In the specification, when an element or layer is referred to as being "on", "connected to", or "coupled to" another element or layer, it can be directly on, directly connected, or directly coupled to the other element or layer, or intervening elements or layers may be present. In contrast, when an element is referred to as being "directly on," "directly connected to" or "directly coupled to" another element or layer, there are no intervening elements or layers (except possible environmental elements such as air) present between the two elements or two layers. Like numbers may refer to like elements in the specification. As used herein, the term "and/or" may include any and all combinations of one or more of the associated listed items.

Although the terms first, second, etc. may be used herein to describe various elements, components, regions, layers and/or sections, these elements, components, regions, layers and/or sections should not be limited by these terms. These terms may be used to distinguish one element, component, region, layer or section from another region, layer or section. Thus, a first element, component, region, layer or section discussed below could be termed a second element, component, region, layer or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

Spatially relative terms, such as "beneath", "below", "lower", "above", "upper", etc. may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The 5 device may be otherwise oriented (rotated 90 degrees or at other orientations) and the spatially relative descriptors used herein interpreted accordingly.

The terminology used herein is for the purpose of describing particular embodiments and is not intended to be limiting of the invention. As used herein, the singular forms, "a", "an", and "the" may include the plural forms as well, unless the context clearly indicates otherwise. The terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
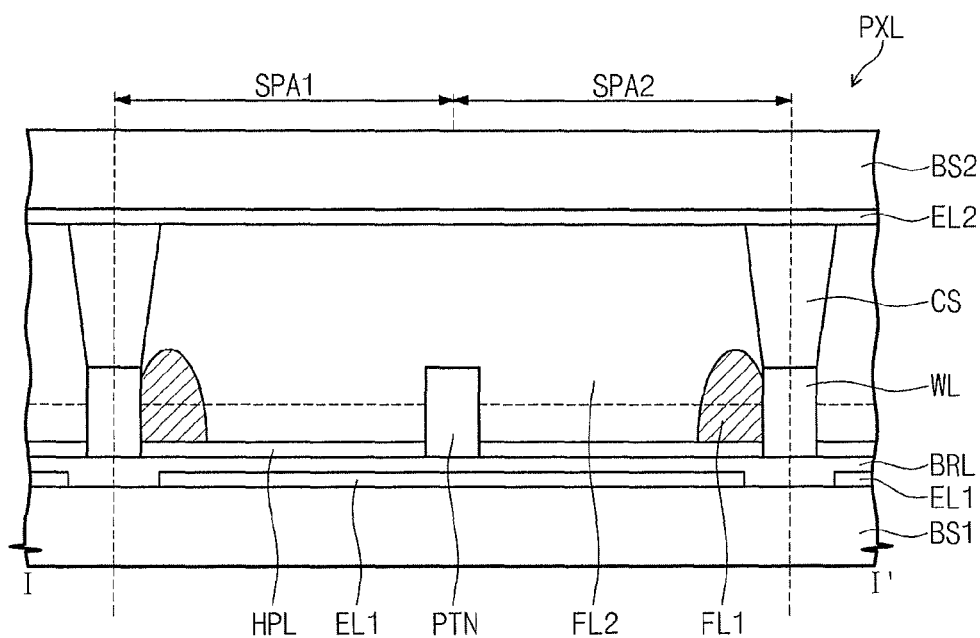
FIG. 1B is a cross-sectional view taken along a line I-I' indicated in FIG. 1A.

FIG. 1A is a plan view illustrating an electrowetting display device according to one or more embodiments of the present invention. FIG. 1B is a cross-sectional view taken along a line I-I' indicated in FIG. 1A.

The electrowetting display device may include a plurality of pixels arranged in a matrix form. The pixels may have analogous configurations, functions, and/or features. FIGS. 1A and 1B illustrate a pixel PXL of the pixels as an example.

Referring to FIGS. 1A and 1B, the pixel PXL includes (a portion of) an array substrate, (a portion of) an opposite substrate, and an electrowetting layer that may include a first fluid FL1 (or 5 first-type fluid FL1) and a second fluid FL2 (or second-type fluid FL2). The array substrate includes a first base substrate BS1, a first electrode EL1, a switching device (not shown), a barrier wall WL, a partition wall PTN, and a hydrophobic layer HPL. The opposite substrate includes a second base substrate BS2, a second electrode EL2, and a column spacer CS. The first electrode EL1, the switching device, and the second electrode EL2 may serve as an electronic device configured to drive the electrowetting layer fluids FL1 and FL2.

The electrowetting display device includes a front surface on which an image is displayed and a rear surface opposite the front surface. A viewer may perceive the image displayed on the electrowetting display device in front of the front surface. In one or more embodiments, an outer surface of the second base substrate BS2 (i.e., an upper surface of the second base substrate BS2 in FIG. 1) is referred to as the front surface or the upper surface, and an opposite surface to the front or upper surface is referred to as the rear surface or a lower surface. Nevertheless, the positions of the front surface and the rear surface should not be limited thereto or thereby. The positions of the front surface and the rear surface may be changed depending on an operation mode of the electrowetting display device, such as a reflective mode, a transmissive mode, a transflective mode, etc. The electrowetting display device may be a segmented display type device in which the image includes and/or is built up of segments. The electrowetting display device may be an active matrix driving display device or a passive matrix driving display device.

Each of the first base substrate BS1 and the second base substrate BS2 may be formed as a single body to be commonly shared by the pixels PXL or may include a plurality of substrate members. Each pixel PXL may include a portion of each base substrate, may include a portion of a base substrate and a substrate member, or may include two opposite substrate members. The first base substrate BS1 and/or the second base substrate BS2 may be, but not limited to, a transparent insulator, such as a glass element or a polymer element (e.g., a plastic element). In one or more embodiments, at least one of the first base substrate BS1 and the second base substrate BS2 may be a plastic substrate. In one or more embodiments, at least one of the first base substrate BS1 and the second base substrate BS2 may include one or more of a polyethylene terephthalate (PET) element, a fiber reinforced plastic (FRP) element, and a polyethylene naphthalate (PEN) element. The first base substrate BS1 and/or the second base substrate BS2 may be rigid or may be flexible.

The electrowetting display device may include a plurality of pixel areas, wherein each pixel area of the plurality of pixel areas may correspond to a pixel of the plurality of pixels. The barrier wall WL may define and/or surround a pixel area PA corresponding to the pixel PXL. The barrier wall WL absorbs light in a visible wavelength range and has a black color. Accordingly, the barrier wall WL may prevent image crosstalk between adjacent pixels and/or may prevent light from leaking between adjacent pixels.

The area of the pixel area PA defined by the barrier wall WL has been represented by dotted lines in FIG. 1A. In one or more embodiments, the barrier wall WL is formed on and/or protrudes from the first base substrate BS1. The first base substrate BS1 (a barrier layer BRL, and/or the hydrophobic layer HPL) and the barrier wall WL may define a space in each pixel area PA.

The pixel area PA may have one of various shapes in accordance with the shape of the pixel PXL. In one or more embodiments, as illustrated in FIG. 1A, the pixel area PA may have a rectangular shape. In one or more embodiments, the pixel area PA may have a polygonal shape (that may not be rectangular).

The partition wall PTN is provided in the pixel area PA to divide the pixel area PA into a plurality of sub-pixel areas, wherein each sub-pixel area of the plurality of sub-pixel areas may include a sub-space for containing a set of the first fluid FL1 (or a set of the first-type fluid FL1), and wherein the space defined by the first base substrate BS1 and the barrier wall WL include the subspaces. In one or more embodiments, the plurality of sub-pixel areas may include two sub-pixel areas, e.g., a first sub-pixel area SPA1 and a second sub-pixel area SPA2, as illustrated in in FIGS. 1A and 1B. The first sub-pixel area SPA1 may include a first sub-space containing a first set of the first fluid; the second sub-pixel area SPA2 may include a second sub-space containing a second set of the first fluid. The barrier wall WL may surround both the first sub-space and the second sub-space. The partition wall PTN may be disposed between the first sub-space and the second sub-space. In one or more embodiments, the pixel area PA may be divided into three or more sub-pixel areas. The sub-pixel areas partitioned by the partition wall PTN may have the same shape and/or may have the same size. In one or more embodiments, the pixel area PA has a rectangular shape, the partition wall PTN is disposed a center portion of the rectangular shape and is substantially parallel to at least one of the four sides of the rectangular shape, and thus the first sub-pixel area SPA1 and the second sub-pixel area SPA2 may have the same shape and may have the same size. As illustrated in FIG. 1A, the pixel area PA has the rectangular shape with long sides and short sides, and the partition wall PTN is disposed at the middle between the short sides corresponding to center portions of the long sides. Both end pmlions of the partition wall PTN are connected to the barrier wall WL, so that each of the first sub-pixel area SPA1 and the second sub-pixel area SPA2 is closed. The partition wall PTN may protrude from the barrier wall WL and/or may be integrally formed with the barrier wall WL.

The barrier wall WL and the partition wall PTN may restrict movement of at least one of the first fluid FL1 and the second fluid FL2.

In one or more embodiments, the barrier wall WL and/or the partition wall PTN may have a height that is sufficient to prevent the first fluid FL1 from diffusing to adjacent pixels and/or diffusing to an adjacent sub-pixel area when the electronic device is operated. In one or more embodiments, the height of the partition wall PTN with respect to the first substrate BS1 may be substantially equal to the height of the barrier wall WL with respect to the first substrate BS1.

In one or more embodiments, at least one surface of the barrier wall WL and at least one surface of the partition wall PTN has property that is incompatible with the property of the first fluid FL1 or the second fluid FL2 in order to restrict movement of the first fluid FL1 or the second fluid FL2. In one or more embodiments, the first fluid FL1 has hydrophobicity, and at least one surface of the barrier wall WL and at least one surface of the partition wall PTN have hydrophilicity that is exclusive (and incompatible) to the hydrophobicity, for restricting movement of the first fluid FL1. In one or more embodiments, an upper surface of the barrier wall WL that is substantially parallel to the first base substrate BS1 and side surfaces of the barrier wall WL that are perpendicular to (and/or not parallel to) the upper surface of the barrier wall WL and the first base substrate BS1 (and/or parallel to the partition wall PTN) may have the hydrophilicity. In one or more embodiments, the side surfaces of the barrier wall WL may have hydrophobicity, and the upper surface of the barrier wall WL may have the hydrophilicity. In one or more embodiments, an upper surface of the partition wall PTN that is substantially parallel to the first base substrate BS1 and side surfaces of the partition wall PTN that are perpendicular to (and/or not parallel to) the upper surface of the partition wall PTN and the first base substrate BS1 (and/or parallel to the barrier wall WL) may have the hydrophilicity. In one or more embodiments, the side surfaces the partition wall PTN may have hydrophobicity, and the upper surface of the partition wall PTN may have the hydrophilicity. Thus, the barrier wall WL and the partition wall PTN may not be easily wetted by the first fluid FL1, and the first fluid FL1 may not enter an adjacent pixel area PA or enter an adjacent sub-pixel area even though the height of the barrier wall WL and the height of the partition wall PTN may be lower than the maximum height of the first fluid FL1 in one or more embodiments.

The column spacer CS may be disposed on the second base substrate BS2 and/or may protrude from the second base substrate BS2. The column spacer CS is located at a position corresponding to the barrier wall WL, and a contact surface of the column spacer CS may directly contact the barrier wall WL. The column spacer CS maintains a distance (hereinafter referred to as a cell gap) between the first base substrate BS1 and the second base substrate BS2 (or between the barrier layer BRL or the hydrophobic layer HPL and the second electrode EL2) in cooperation with the barrier wall WL. The column spacer CS has a height greater than that of the barrier wall WL. The cell gap is set to allow the first fluid FL1 and the second fluid FL2 provided in each pixel area PA to smoothly move in the pixel area PA. Particularly, the cell gap is set to have a value greater than the maximum height of the first fluid FL1, such that the first fluid FL1 may not contact the second base substrate BS2 (and/or the second electrode EL2) while moving in the pixel area PA.

The hydrophobic layer HPL is provided in the sub-pixel areas defined by the barrier wall WL and the partition wall PTN and is disposed on the first base substrate BS1. The hydrophobic layer HPL may be disposed between at least two portions of the barrier wall WL in a pixel PXL. In one or more embodiments, a hydrophobic layer HPL may be disposed in a sub-space and disposed between at least a portion of the barrier wall WL and the partition wall PTN. In one or more embodiments, a hydrophobic layer HPL may overlap the barrier wall WL and/or may overlap the partition wall PTN.

The hydrophobic layer HPL may include a compound that contains fluorine atoms. In one or more embodiments, the fluorine-compound may be a polymer compound represented by one or more of the following chemical formulas: $-C_xF_y-$, $C_xF_yH_z-$, $-C_xF_yC_zH_p-$, $-C_xF_yO-$, $-C_xF_yN(H)-$, etc., wherein each of x, y, z, p, n, and m is an integer number equal to or larger than 1. In one or more embodiments, the fluorine-containing compound may be an amorphous fluorine compound.

The hydrophobic layer HPL may have permeability or reflectiveness for light. In one or more embodiments, the hydrophobic layer HPL has reflectiveness, such that light provided from a light source and incident on the hydrophobic layer HPL may be totally reflected by the hydrophobic layer HPL. In one or more embodiments, the hydrophobic layer HPL may have the white color. In one or more embodiments, the hydrophobic layer HPL may absorb a portion of light corresponding to a specific wavelength and may reflect another portion of the light to display a specific color.

The barrier layer BRL may be disposed between the first base substrate BS1 and the hydrophobic layer HPL and/or may be disposed between the first base substrate BS1 and the barrier wall WL. The barrier layer BRL may prevent at least one of the electrowetting layer fluids FL1 and FL2 from contacting a portion of the electronic device, such as the first electrode EL1. The barrier layer BRL may have a single-layer structure or a multi-layer structure, e.g., a double-layer structure.

The electrowetting layer fluids FL1 and FL2 are disposed in the space (and the sub-spaces) defined by the barrier wall WL (and the partition wall PTN) with at least one of the first base substrate BS1 and the second base substrate BS2 and/or one or more elements disposed on at least one of the first base substrate BS1 and the second base substrate BS2. The electrowetting layer fluids FL1 and FL2 may include the first fluid FL1 (or first-type fluid FL1) and the second fluid FL2 (or second-type fluid FL2). The first fluid FL1 and the second fluid FL2 are immiscible with each other. The second fluid FL2 may have electrical conductivity and/or polarity. For example, the second fluid FL2 may include at least one of potassium chloride solution, sodium chloride, water, and ethyl alcohol. The second fluid FL2 may be transparent or may have a color. As an example, the second fluid FL2 may have the white color. As another example, the second fluid FL2 may absorb or reflect light with one or more particular wavelengths.

The first fluid FL1 may be electrically nonconductive. In one or more embodiments, the first fluid FL1 may include at least one of alkane (e.g., hexadecane) and oil (e.g., silicone oil). In one or more embodiments, the first fluid FL1 may include oil that is not electrically conductive, and the second fluid FL2 may be an electrolyte solution having electrical conductivity.

The first fluid FL1 may absorb at least a portion of the optical spectrum of a visible light. The first fluid FL1 may transmit the remaining portion of the optical spectrum, so that the first fluid FL1 may display a color. The first fluid FL1 may include pigment particles or dyes for displaying the color. According to one or more embodiments, the first fluid FLI may be colored with a black dye. Therefore, the first fluid FL1 may absorb substantially the entire optical spectrum of an incident light. In one or more embodiments, the second fluid FL2 may reflect the optical spectrum.

An electronic device is provided in each pixel PXL and applies an electric potential difference between the electrodes EL1 and EL2 to control the electrowetting layer fluids FL1 and FL2.

Among the parts of the electronic device, the first electrode EL1 is disposed on the first base substrate BS1, and the second electrode EL2 is disposed on the second base substrate BS2. The first electrode EL1 may be disposed between the first base substrate BS1 and the hydrophobic layer HPL and may overlap (and partially cover) the first sub-pixel area SPA1 and the second sub-pixel area SPA2. The first electrode EL1 may be integrally formed as a single unitary and individual unit to substantially simultaneously cover a portion of the first sub-pixel area SPA1 and a portion of the second sub-pixel area SPA2. The first electrode EL1 may overlap the partition wall PTN.

In one or more embodiments, the electrowetting display device is a transmission type electrowetting display device, and the first electrode EL1 may include a transparent conductive material, such as indium tin oxide (ITO), indium zinc oxide (IZO), or indium tin zinc oxide (ITZO). In one or more embodiments, the electrowetting display device is a reflection type electrowetting display device, and the first electrode EL1 may include a reflective conductive material, such as a metal material, e.g., aluminum.

The first electrode EL1 may have a shape that is the same as or similar to that of the pixel area PA, but the shape of the first electrode EL1 should not be limited thereto or thereby. In the plan view of the electrowetting display device, the first electrode EL1 may partially overlap the pixel area PA without completely overlapping the pixel area PA, such that the first electrode EL1 does not overlap a portion of the pixel area PA, e.g., a corner portion of the pixel area PA. The first electrode EL1 may have an area smaller than that of the pixel area PA so as not to cover the portion of the pixel area PA. A space in the pixel area PA corresponding to the portion of the PA not covered or overlapped by the first electrode EL1 may not be substantially affected by the voltage applied to the first electrode EL1, and thus the first fluid FL1 may be substantially gathered to the space in the pixel area that is not overlapped by the first electrode EL1; the space in the pixel area may be considered a collection point for the first fluid FL1. In FIG. 1A, a substantial portion of the first fluid FL1 is gathered to the portion of the pixel area PA between the first electrode EL1 and the barrier wall WL in the plan view of the electrowetting display device. In one or embodiments, the first electrode Ell may have a shape that is different from that the shape of the first electrode EL1 illustrated in FIG. 1A; accordingly, the collection point may be located at different positions.

The second electrode EL2 may be integrally formed as a single unitary and individual unit to cover all the pixels PXL of the electrowetting display device. In one or more embodiments, the second electrode EL2 may include a plurality of separate electrode members respectively corresponding to the pixels PXL, and the electrode members of the second electrode EL2 may be electrically connected to each other. The second electrodes EL2 may make contact with the second fluid FL2 to be connected to each other. In one or more embodiments, the second electrode EL2 may include a transparent conductive material, such as indium tin oxide (ITO), indium zinc oxide (IZO), or indium tin zinc oxide (ITZO).

In one or more embodiments, the first electrode EL1 and the second electrode EL2 are respectively disposed on the first base substrate BS1 and the second base substrate BS2, but they should not be limited thereto or thereby. In one or more embodiments, both the first electrode EL1 and the second electrode EL2 may be disposed on the first base substrate BS1, wherein the second electrode EL2 may be provided at one or more sides of the first electrode EL1 and may be electrically insulated from the first electrode EL1. For example, the first electrode EL1 may be provided in a portion of the pixel area PA surrounded by the barrier wall WL, and the second electrode EL2 may be provided in the other portion of the pixel area PA and may be insulated from the first electrode EL1 by the barrier wall WL. In one or more example, the first electrode EL1 may overlap the pixel area PA and may be surrounded by the barrier wall WL, and the second electrode EL2 may be provided on a side surface of the barrier wall WL and may be insulated from the first electrode EL1 by the barrier wall WL.

The switching device (not illustrated) is disposed on the first base substrate BS1 and electrically connected to the first electrode EL1. The pixel PXL is in an ON-state when different voltages are respectively applied to the first electrode EL1 and the second electrode EL2. The voltage difference may result in one or more electrostatic forces, e.g., one or more attraction forces and/or one or more repulsion forces, that may move the second fluid FL2 to the first electrode EL1, and thus the first fluid FL1 (which substantially covers the hydrophobic layer HPL in the sub-space associated with the first fluid FL1) is pushed away from a substantial portion of the hydrophobic layer HPL to a smaller portion of the hydrophobic layer HPL at the barrier wall WL, which surrounds the hydrophobic layer HPL, such that the first fluid FL1 may accumulate at the collection point, which does not substantially overlap the first electrode EL1. When the first fluid FL1 is completely pushed to the barrier wall WL by the second fluid FL2, the first fluid FL1 may have a drop shape (at least in the cross-sectional view of the electrowetting display device) as illustrated by a hatched drop shape (or drop shape with hatching) in FIG. 1B. The first fluid FL1 has the maximum height of the first fluid FL1 when the pixel PXL is in the ON-state. Accordingly, the hydrophobic layer HPL of the pixel PXL only partially or minimally covered by the first fluid FL1, and a substantial portion of the hydrophobic layer HPI may be exposed.

When the difference between the voltages applied to the electrodes EL1 and EL2 returns to about zero volts and/or is below a threshold value, the pixel PXL returns to an OFF-state, so that the first fluid FL1 substantially covers the hydrophobic layer HPL again since the electrostatic force caused by the electric potential difference disappears. In FIG. 1B, the upper surface of the first fluid FL1 is represented by a dashed line when the pixel PXL is in the OFF-state.

In one or more embodiments, the first fluid FL1 and the second fluid FL2 are substantially simultaneously controlled in the first sub-pixel area SPA1 and the second sub-pixel area SPA2 in accordance with the ON-state and the OFF-state of the pixel PXL. As a result, the first fluid FL1 serves as an optical switch that is able to be electrically controlled in each pixel PXL.

Figure 2:
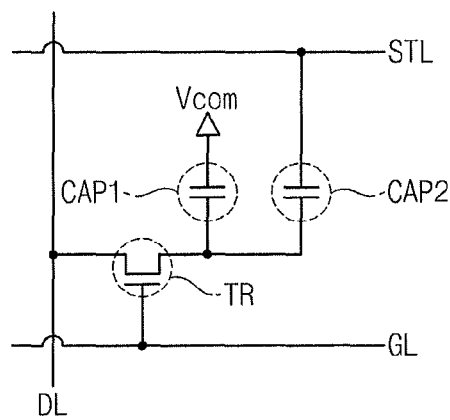
FIG. 2 is a circuit diagram illustrating an active matrix type pixel including a switching device.

FIG. 2 is a circuit diagram illustrating an active matrix type pixel including a switching device.

The switching device includes a transistor TR, a first capacitor CAP1, and a second capacitor CAP2 configured to control the electrowetting layer fluids FL1 and FL2 in the pixel area PA in response to a gate signal and/or an image signal. In one or more embodiments, each pixel may include one or more transistors. FIG. 2 illustrates a transistor TR in the pixel as an example.

The transistor TR includes a gate electrode, a source electrode, and a drain electrode. The transistor TR is electrically connected to a line pmt. The line part includes a gate line GL and a data line DL, which are electrically connected to the transistor TR. The gate electrode is connected to the gate line GL, the source electrode is connected to the data line DL, and the drain electrode is connected to the capacitors CAP1 and CAP2. The first capacitor CAP1 is an electrowetting capacitor that may include the first electrode EL1, the second electrode EL2, and at least a fluid provided between the first electrode EL1 and the second electrode EL2. The second electrode EL2 may receive a common voltage Vcom that may be applied to the second fluid FL2 since the second fluid FL2 may contact the second electrode EL2. The second capacitor CAP2 is a storage capacitor configured to include the drain electrode (and/or the first electrode EL1), a storage electrode, and an insulating layer disposed between the drain electrode (and/or the first electrode EL1) and the storage electrode. The storage electrode is connected to a storage line STL.

The voltage applied to the first electrode EL1 is set by the data line DL while the transistor TR is turned on. When a gate signal is applied to the gate line GL, the transistor TR is turned on, and thus the voltage applied to the data line DL is applied to the capacitors CAP1 and CAP2. After the data voltage is applied to the first electrode EL1, the data voltage remains in the capacitors due to a coupling capacitance of one or more of the capacitors CAP1 and CAP2 so as to maintain the state of the pixel PXL until the voltage is refreshed.

An electrowetting display device having the structures discussed with reference to FIGS. 1A, 1B, and 2 may have a satisfactorily fast response speed and a satisfactorily high light transmittance. In an electrowetting display device, if the pixel area is large (e.g., larger than a threshold area size associated with the fluid dynamic of the electrowetting layer fluids), the colored fluid (i.e., the first fluid FL1) may not sufficiently and timely cover the pixel area when the pixel is changed from the ON-state to the OFF-state. On the other hand, if the pixel area is small (e.g., smaller than the threshold area size), the light transmittance of the electrowetting display device is reduced by the switching device provided in each pixel. In contrast, according to one or more embodiments, the light transmittance reduction caused by the partition wall PTN may be less significant than the light transmittance reduction that may be caused by a switching device, and the response speed may be sufficiently fast since a movement distance of the first fluid is substantially short when the pixel PXL is changed from the ON-state to the OFF-state or is changed from the OFF-state to the ON-state. Advantageously, the electrowetting display device may have a satisfactorily high light transmittance and a satisfactorily fast response speed.

Figure 3A:
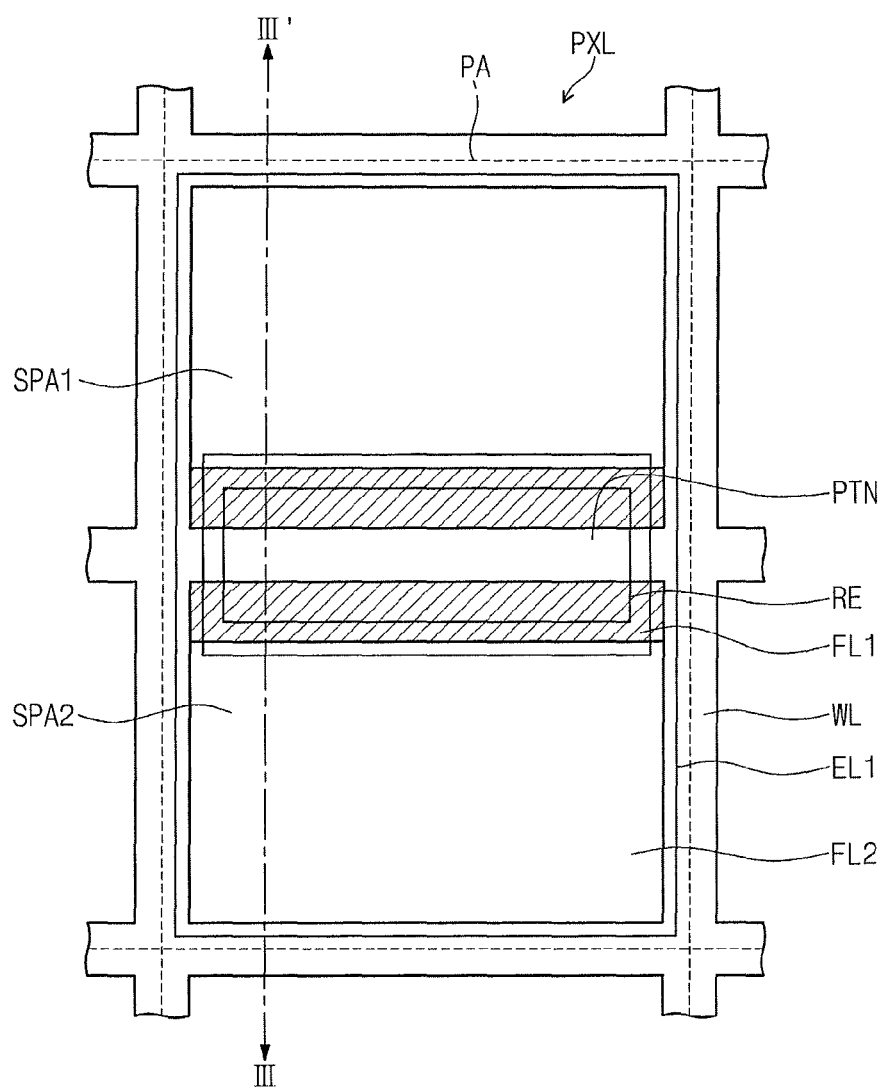
FIG. 3A is a plan view illustrating an electrowetting display device according to one or more embodiments of the present invention.
Figure 3B:
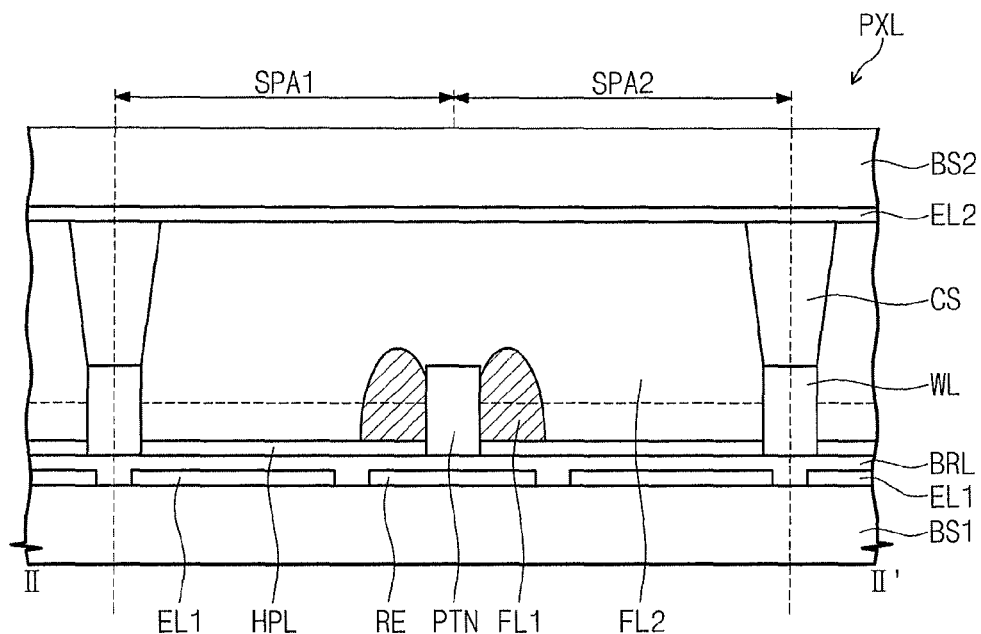
FIG. 3B is a cross-sectional view taken along a line II-II' indicated in FIG. 3A.

FIG. 3A is a plan view illustrating an electrowetting display device according to one or more embodiments of the present invention, and FIG. 3B is a cross-sectional view taken along a line II-II' indicated in FIG. 3A. In one or more embodiments, the collection point for the first fluid is disposed adjacent to the center portion of the pixel, i.e., disposed at a position adjacent to the partition wall.

In FIGS. 3A and 3B, the same reference numerals may denote elements that are analogous to or identical to elements illustrated in FIGS. 1A and 1B, and detailed descriptions of analogous or identical elements may be omitted.

Referring to FIGS. 3A and 3B, the pixel PXL includes (a portion of) an array substrate, (a portion of) an opposite substrate, and electrowetting layer fluids, e.g., a first fluid FL1 and a second fluid FL2. The array substrate includes a first base substrate BS1, a first electrode EL1, a reference electrode RE, a switching device (not shown), a barrier wall WL, a partition wall PTN, and a hydrophobic layer HPL. The opposite substrate includes a second base substrate BS2, a second electrode EL2, and a column spacer CS. The first electrode EL1, the reference electrode RE, the switching device, and the second electrode EL2 may serve as an electronic device configured to drive the electrowetting layer fluids FL1 and FL2.

An electronic device is provided in each pixel PXL and applies an electric potential difference between the electrodes EL1 and EL2 to control the electrowetting layer fluids FL1 and FL2.

Among the parts of the electronic device, the first electrode EL1 and the reference electrode RE are disposed on the first base substrate BS1, and the second electrode EL2 is disposed on the second base substrate BS2.

The first electrode EL1 is disposed between the first base substrate BS1 and the hydrophobic layer HPL and covers a portion of the first sub-pixel area SPA1 and a portion of the second sub-pixel area SPA2. An outer portion of the first electrode EL1 may overlap the barrier wall WL to prevent the corresponding first fluid FL1 from being collected adjacent to the barrier wall WL. The first electrode EL1 has a through opening (or through hole) positioned between the first base substrate BS1 and the partition wall PTN; material of the first electrode EL1 is not formed in the through opening. The through opening may be partially or completely surrounded by the material of the first electrode EL1 and may be rectangular in the plan view of the electrowetting display device.

As illustrated in FIG. 3A, the first electrode EL1 may be integrally formed as a single unitary unit disposed in the first sub-pixel area SPA1 and the second sub-pixel area SPA2. In one or more embodiments, the first electrode EL1 is not required to be integrally formed as a single unitary unit as long as the portion of the first electrode EL1 disposed in the first sub-pixel area SPA1 and the portion of the first electrode EL1 disposed in the second sub-pixel area SPA2 are electrically connected to each other and/or as long as the portion of the first electrode EL1 disposed in the first sub-pixel area SPA1 and the portion of the first electrode EL1 disposed in the second sub-pixel area SPA2 are substantially simultaneously operated by the switching device.

The reference electrode RE may be spaced from the first electrode EL1. In one or more embodiments, the reference electrode RE may be spaced from the first electrode EL1 and may be located inside the opening of the first electrode EL1.

The reference electrode RE may be electrically insulated from the first electrode EL1 and may be applied with a reference voltage that may be independent of the voltage applied to the first electrode EL1. The reference voltage applied to the reference electrode RE has a level that is substantially equal to level of the common voltage applied to the second electrode EL2. Accordingly, there may be substantially no electric potential difference between the reference electrode RE and the second electrode EL2.

The reference electrode RE is disposed on the same layer as and formed of the same material as the first electrode EL1. Therefore, the first electrode EL1 and the reference electrode RE may be formed in a single process. In one or more embodiments, the electrowetting display device is a transmission type electrowetting display device, and the first electrode EL1 and the reference electrode RE may include a same transparent conductive material, such as indium tin oxide (ITO), indium zinc oxide (IZO), or indium tin zinc oxide (ITZO). In one or more embodiments, the electrowetting display device is a reflection type electrowetting display device, and the first electrode EL1 and reference electrode RE may include a same reflective conductive material, such as a metal material, e.g., aluminum.

As illustrated in FIGS. 3A and 3B, the reference electrode RE may partially overlap the partition wall PTN. In the plan view of the electrowetting display device, portions of the reference electrode RE that do not overlap the partition wall PTN are located at two sides of the partition wall PTN and are symmetrical with respect to the partition wall PTN to allow two sets of the first fluid FL1 to be gathered to the two sides of the partition wall PTN.

The switching device is disposed on the first base substrate BS1 and is connected to the first electrode EL1.

The pixel PXL is in the ON-state when a voltage that is different from each of the reference voltage and the common voltage is applied to the first electrode EL1. The electric potential difference between the first and second electrodes EL1 and EL2 and the electric potential difference between the first electrode EL1 and the reference electrode RE may result in one or more electrostatic forces, e.g., one or more attraction forces and/or one or more repulsion forces, that may move the second fluid FL2 to the first electrode EL1. Since substantially no voltage level difference exists between the second electrode EL2 and the reference electrode RE, no substantial electrostatic forces act between the second fluid FL2 and the second electrode EL2 and between the second fluid FL2 and the reference electrode RE. Accordingly, the second fluid FL2 covers the first electrode EL1 to push away the first fluid FL1 to the reference electrode RE and the partition wall PTN. As a result, the upper surface of the reference electrode RE may correspond to the collection point for the first fluid FL1. In the one or more embodiments, since the reference electrode RE overlaps the two sides of the partition wall PTN and overlaps the partition wall PTN, the first fluid FL1 is gathered to the areas immediately adjacent to the partition wall PTN, e.g., the center portion of the pixel area PA. When the first fluid FL1 is completely pushed to the partition wall PTN and overlaps the reference electrode RE, the first fluid FL1 may have a drop shape (at least in the cross-sectional view of the electrowetting display device) as illustrated by a hatched drop shape in FIG. 3B. The first fluid FL1 has the maximum height of the first fluid FL1 when the pixel PXL is in the ON-state.

When the difference between the voltage applied to the first electrode EL1 and each of the voltages applied to the reference electrode RE and the second electrode EL2 returns to about zero volts and/or is below a threshold value, the pixel PXL returns to an OFF-state, so that the first fluid FL1 substantially covers the hydrophobic layer HPL again since the electrostatic force caused by the electric potential difference disappears. Accordingly, the first fluid FL1 may serve as an optical switch that may be electrically controlled in each pixel PXL.

In an electrowetting display device having the structures discussed with reference to FIGS. 3A and 3B, movement and restitution of the fluids may be substantially efficient since the collection of the first fluid is controlled using the electric potential difference. Thus, the response speeds of the ON- and OFF-states of the pixel may be satisfactorily fast, and non-closing of the first fluid FL1 may be prevented. Advantageously, reproducibility and quality of displayed images may be satisfactory.

Figure 4A:
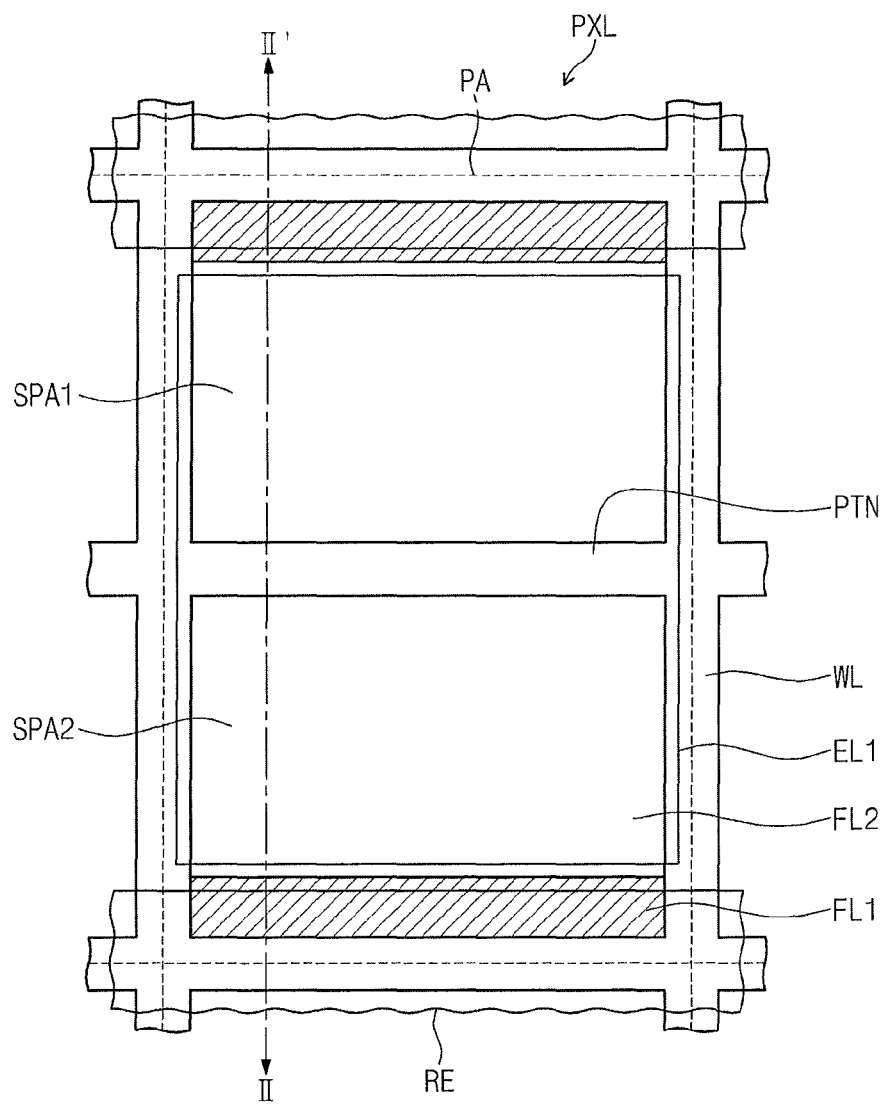
FIG. 4A is a plan view illustrating an electrowetting display device according to one or more embodiments of the present invention.
Figure 4B:
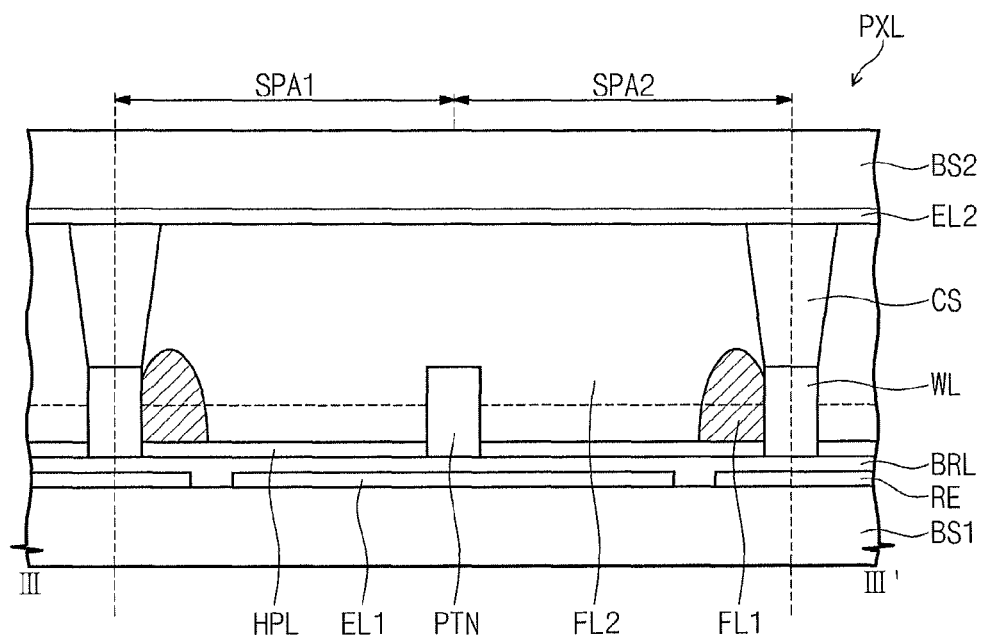
FIG. 4B is a cross-sectional view taken along a line indicated in FIG. 4A.

FIG. 4A is a plan view illustrating an electrowetting display device according to one or more embodiments of the present invention, and FIG. 4B is a cross-sectional view taken along a line indicated in FIG. 4A.

Referring to FIGS. 4A and 4B, the pixel PXL includes (a portion of) an array substrate, (a portion of) an opposite substrate, and electrowetting layer fluids, e.g., a first fluid FL1 and a second fluid FL2. The array substrate includes a first base substrate BS1, a first electrode EL1, a reference electrode RE, a switching device (not shown), a barrier wall WL, a partition wall PTN, and a hydrophobic layer HPL. The opposite substrate includes a second base substrate BS2, a second electrode EL2, and a column spacer CS. The first electrode EL1, the reference electrode RE, the switching device, and the second electrode EL2 may serve as an electronic device configured to drive the electrowetting layer fluids FL1 and FL2.

An electronic device is provided in each pixel PXL and applies an electric potential difference between the electrodes EL1 and EL2 to control the electrowetting layer fluids FL1 and FL2.

Among the parts of the electronic device, the first electrode EL1 and the reference electrode RE are disposed on the first base substrate BS1, and the second electrode EL2 is disposed on the second base substrate BS2.

The first electrode EL1 is disposed between the first base substrate BS1 and the hydrophobic layer HPL and covers a portion of the first sub-pixel area SPA1 and a portion of the second sub-pixel area SPA2. In the plan view of the electrowetting display device, the first electrode EL1 has a rectangular shape, which may be similar to the shape of the pixel area PA, and two end portions of the first electrode EL1 in a longitudinal direction (or length direction) are spaced from the barrier wall WL. Two end portions of the first electrode EL1 in a width direction (perpendicular to the length direction) overlap the barrier wall WL, as illustrated in FIG. 4A.

As illustrated in FIG. 4A, the first electrode EL1 may be integrally formed as a single unitary unit disposed in the first sub-pixel area SPA1 and the second sub-pixel area SPA2, and the partition wall PTN may overlap the first electrode EL1. In one or more embodiments, the first electrode EL1 is not required to be integrally formed as a single unitary unit as long as the portion of the first electrode EL1 disposed in the first sub-pixel area SPA1 and the portion of the first electrode EL1 disposed in the second sub-pixel area SPA2 are electrically connected to each other and/or as long as the portion of the first electrode EL1 disposed in the first sub-pixel area SPA1 and the portion of the first electrode EL1 disposed in the second sub-pixel area SPA2 are substantially simultaneously operated by the switching device.

The reference electrode RE is spaced from the first electrode EL1. In one or more embodiments, the reference electrode RE is spaced from the two end portions of the first electrode EL1 in the longitudinal direction (or length direction). The reference electrode RE may contact and/or overlap the barrier wall WL.

The reference electrode RE may be electrically insulated from the first electrode EL1 and may be applied with a reference voltage that may be independent of the voltage applied to the first electrode EL1. The reference voltage applied to the reference electrode RE has a level that is substantially equal to level of the common voltage applied to the second electrode EL2. Accordingly, there may be substantially no electric potential difference between the reference electrode RE and the second electrode EL2.

The reference electrode RE is disposed on the same layer as and formed of the same material as the first electrode EL1. Therefore, the first electrode EL1 and the reference electrode RE may be formed in a single process.

The reference electrode RE may overlap the barrier wall WL and may overlap a pixel area PA of a previous pixel row and a pixel area PA of a present pixel row. Portions of the reference electrode RE may be at edges of a pixel area PA and may contact the barrier wall WL.

In the plan view of the electrowetting display device, two portions of the reference electrode RE that are located at two ends of the barrier walls WL have be symmetrical with respect to the barrier wall WL.

The switching device is disposed on the first base substrate BS1 and is connected to the first electrode EL1.

The pixel PXL is in the ON-state when a voltage that is different from each of the reference voltage and the common voltage is applied to the first electrode EL1. When the pixel PXL is in the ON-state, the second fluid FL2 substantially covers the first electrode EL1 and pushes the first fluid FL1 to the reference electrode RE and the barrier wall WL. As a result, the upper surface of the reference electrode RE may correspond to the collection point for the first fluid FL1. In a pixel area PA, since two reference electrodes RE overlap two portions of the barrier wall WL, which are located at two end portions of the pixel area PA, two sets of the first fluid FL1 are gathered to two areas adjacent to the two portions of the barrier walls WL, i.e., the two end portions of the pixel area PA. When the first fluid FL1 is completely pushed to the barrier wall WL and overlaps the reference electrode RE, the first fluid FL1 may have a drop shape (at least in the cross-sectional view of the electrowetting display device) as illustrated by a hatched drop shape in FIG. 4B. The first fluid FL1 has the maximum height of the first fluid FL1 when the pixel PXL is in the ON-state.

When the difference between the voltage applied to the first electrode EL1 and each of the voltages applied to the reference electrode RE and the second electrode EL2 returns to about zero volts and/or is below a threshold value, the pixel PXL returns to an OFF-state. The electrowetting display device discussed with reference to FIGS. 4A and 4B may have advantages and effects analogous to advantages and effects of the electrowetting display device discussed with reference to FIGS. 3A and 3B.

Figure 5A:
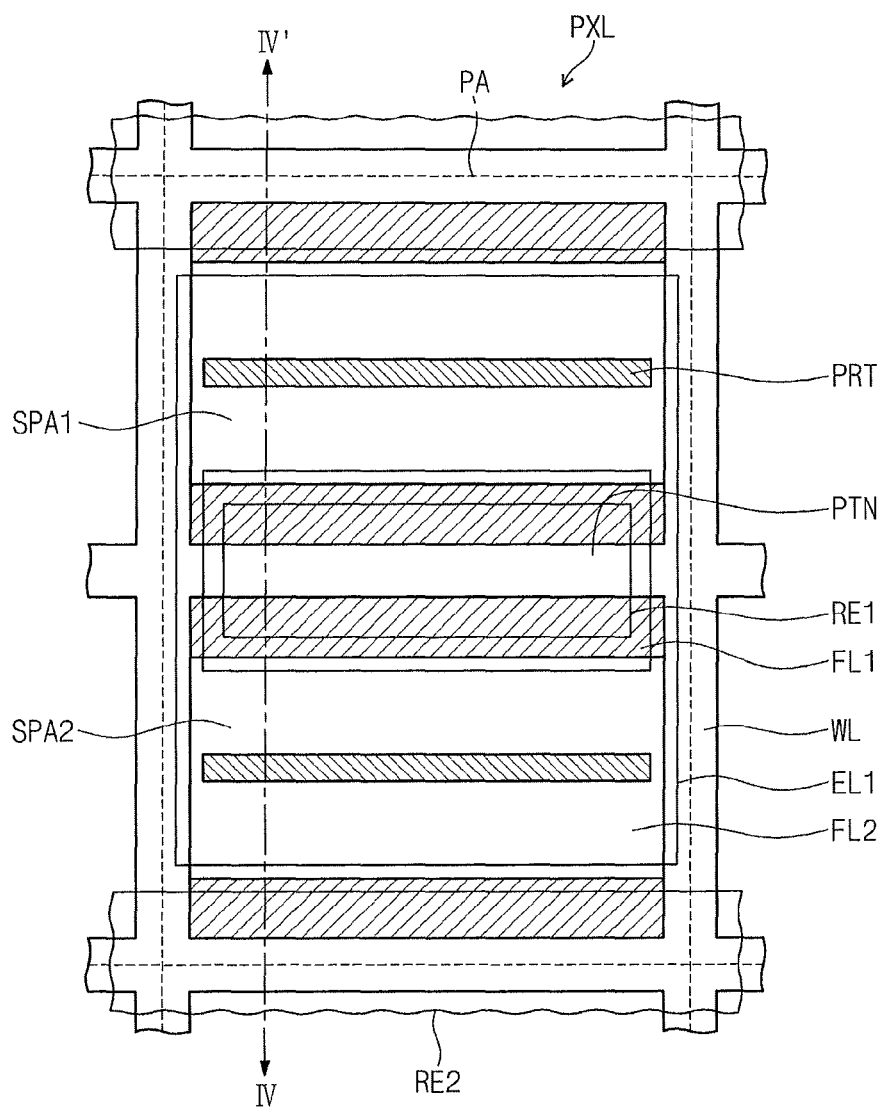
FIG. 5A is a plan view illustrating an electrowetting display device according to one or more embodiments of the present invention.
Figure 5B:
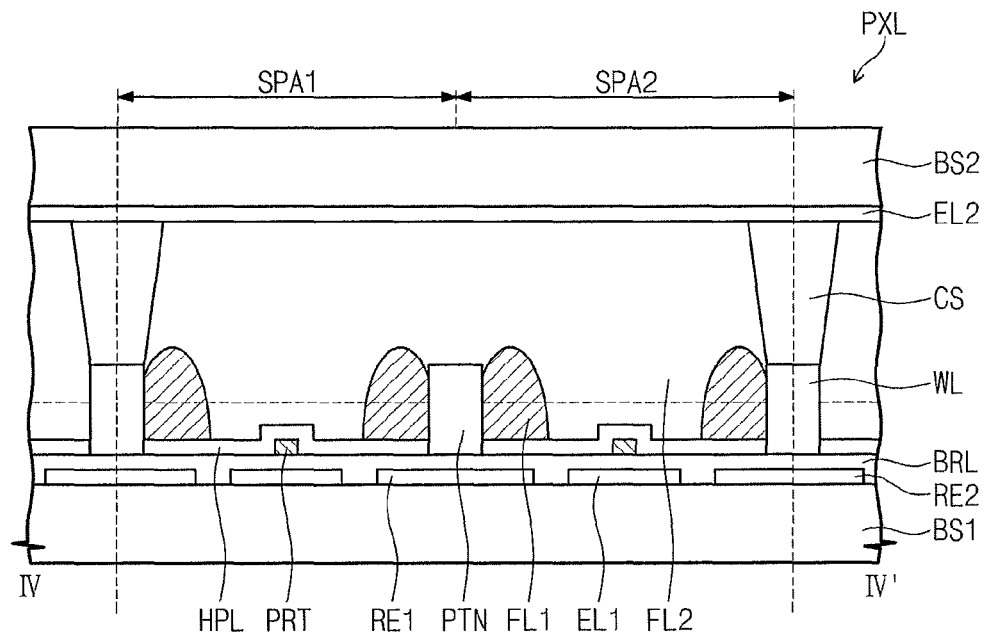
FIG. 5B is a cross-sectional view taken along a line IV-IV' indicated in FIG. 5A.

FIG. 5A is a plan view illustrating an electrowetting display device according to one or more embodiments of the present invention, and FIG. 5B is a cross-sectional view taken along a line IV-IV' indicated in FIG. 5A.

Referring to FIGS. 5A and 5B, the pixel PXL includes (a portion of) an array substrate, (a portion of) an opposite substrate, and electrowetting layer fluids, e.g., a first fluid FL1 and a second fluid FL2. The array substrate includes a first base substrate BS1, a first electrode EL1, a first reference electrode RE1, a second reference electrode RE2, a switching device (not shown), a barrier wall WL, a partition wall PTN, a protrusion PRT, and a hydrophobic layer HPL. A barrier layer BRL is disposed between the first base substrate BS1 and the hydrophobic layer HPL and between the first base substrate BS1 and the barrier wall WL. The opposite substrate includes a second base substrate BS2, a second electrode EL2, and a column spacer CS. The first electrode EL1, the first reference electrode RE1, the second reference electrode RE2, the switching device, and the second electrode EL2 may serve as an electronic device configured to drive the electrowetting layer fluids FL1 and FL2.

The protrusion PRT may protrude from the barrier layer BRL and/or may be disposed on the barrier layer BRL, as illustrated in FIG. 5B. A protrusion PRT is disposed in each sub-pixel area. As illustrated in FIG. 5A, one protrusion PRT is disposed in each of the first sub-pixel area SPA1 and the second sub-pixel area SPA2. The protrusion PRT extends substantially parallel to at least a side of the pixel area PA and extends substantially parallel to the partition wall PTN. The protrusion PRT has a height lower than that of the first fluid FL1 when the first fluid FLI substantially completely covers the first sub-pixel area SPA1 and the second sub-pixel area SPA2 while the pixel PXL is in the OFF-state. The hydrophobic layer HPL is disposed on the barrier layer BRL to cover the protrusion PRT. Accordingly, the protrusion HPL has a hydrophobic surface due to the hydrophobic layer HPL.

An electronic device is provided in each pixel PXL and applies an electric potential difference between the EL1 and EL2 to control the electrowetting layer fluids FL1 and FL2.

Among the parts of the electronic device, the first electrode EL1, the first reference electrode RE1, and the second reference electrode RE2 are disposed on the first base substrate BS1, and the second electrode EL2 is disposed on the second base substrate BS2.

The first electrode EL1 is disposed between the first base substrate BS1 and the hydrophobic layer HPL and covers a portion of the first sub-pixel area SPA1 and a portion of the second sub-pixel area SPA2. In the plan view of the electrowetting display device, the first electrode EL1 has a rectangular shape, which may be similar to the shape of the pixel area PA, and two end portions of the first electrode EL1 in a longitudinal direction (or length direction of the pixel area PA) are spaced from the barrier wall WL. Two end portions the first electrode EL1 in a width direction of the pixel area PA (perpendicular to the length direction of the pixel area PA) overlap the barrier wall WL, as illustrated in FIG. 5A.

As illustrated in FIG. 5A, the first electrode EL1 may be integrally formed as a single unitary unit disposed in the first sub-pixel area SPA1 and the second sub-pixel area SPA2.

As illustrated in FIG. 5A, the first reference electrode REI is spaced apart from the first electrode EL1 and provided in the opening formed through the first electrode EL1. The second reference electrode RE2 is spaced apart from the two end portions of the first electrode EL1 in the longitudinal direction and may contact and/or overlap the barrier wall WL.

The reference electrodes RE1 and RE2 are electrically insulated from the first electrode EL1 and are individually applied with a reference voltage that may be independent of the voltage applied to the first electrode EL1. The reference voltage applied to each of the reference electrodes RE1 and RE2 has a level that is substantially equal to level of the common voltage applied to the second electrode EL2. Accordingly, there may be substantially no electric potential difference between either of the reference electrodes RE1 and RE2 and the second electrode EL2.

The reference electrodes RE1 and RE2 are disposed on the same layer as and formed of the same material as the first electrode EL1.

When the pixel PXL is in the ON-state, a voltage different from the common voltage is applied to the first electrode EL1, and thus an electric potential difference occurs between the first electrode EL1 and the second electrode EL2, between the first electrode EL1 and the first reference electrode RE1, and between the first electrode EL1 and the second reference electrode RE2. An attraction force acts between the second fluid FL2 and the first electrode EL1, and the second fluid FL2 moves to the first electrode EL1 to push away the first fluid FL1. In the area in which the protrusion PRT is disposed (which may be referred to as a breaking point), the second fluid FL2 may easily push away the first fluid FL1 since a distance between the second fluid FL2 and the surface of the protrusion PRT is short. Accordingly, the second fluid FL2 pushes away the first fluid FL1 from the area in which the protrusion PRT is formed, i.e., from the breaking point, and the first fluid FL1 moves away from sides of the protrusion PRT. In order to precisely control the directions to which the fluids FL1 and FL2 move, breaking points may be spaced from the collection points in the subpixel areas. In one or more embodiments, the protrusion PRT is located at a midpoint position between the first reference electrode RE1 and the second reference electrode RE2, which is most far away from both the reference electrodes RE1 and RE2. The pushed first fluid FL1 is gathered at areas overlapping the first reference electrode RE1 and the second reference electrode RE2.

In an electrowetting display device having the structures discussed with reference to FIGS. 5A and 5B, movement and restitution of the fluids may be substantially efficient since the breaking points and the collection points of the fluids FL1 and FL2 are controlled using the protrusion PRT. Thus, the response speeds of the ON- and OFF-states of the pixel may be satisfactorily fast, and nonclosing of the first fluid FL1 may be prevented. Advantageously, reproducibility and quality of the displayed images may be satisfactory.

Figure 6A:
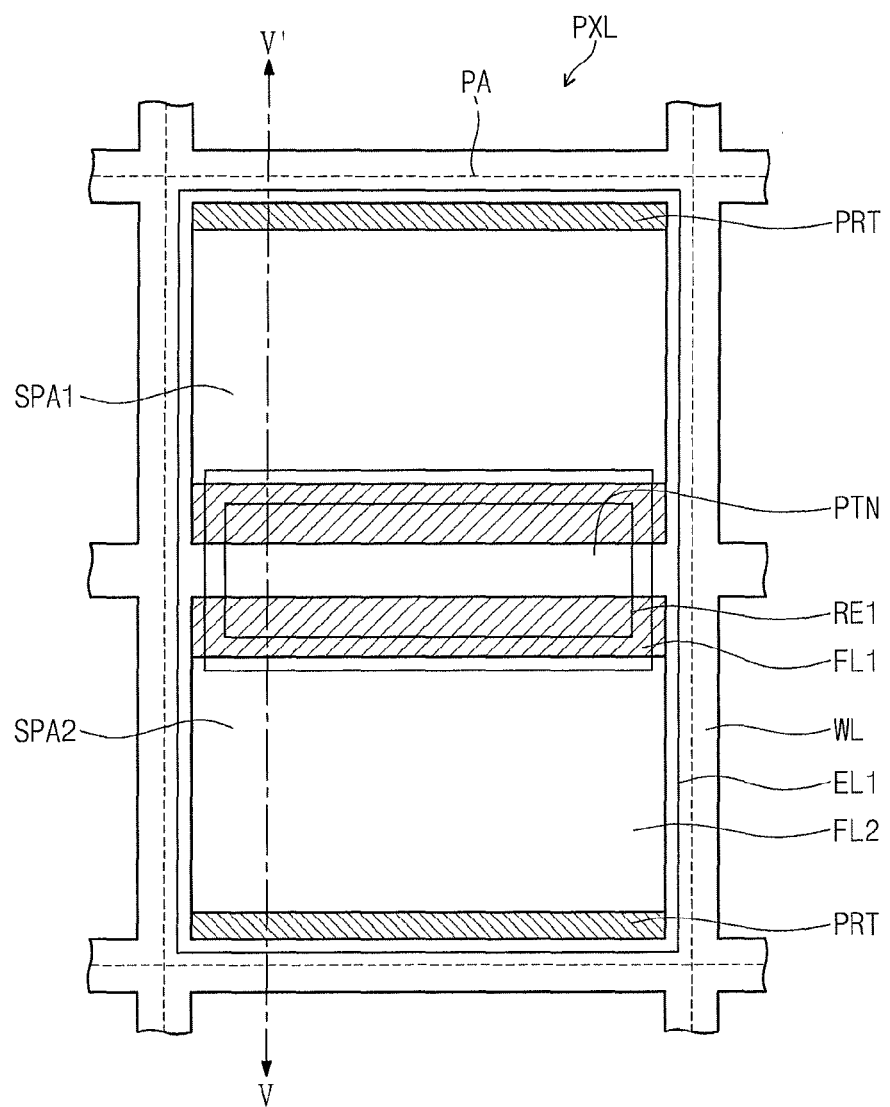
FIG. 6A is a plan view illustrating an electrowetting display device according to one or more embodiments of the present invention.
Figure 6B:
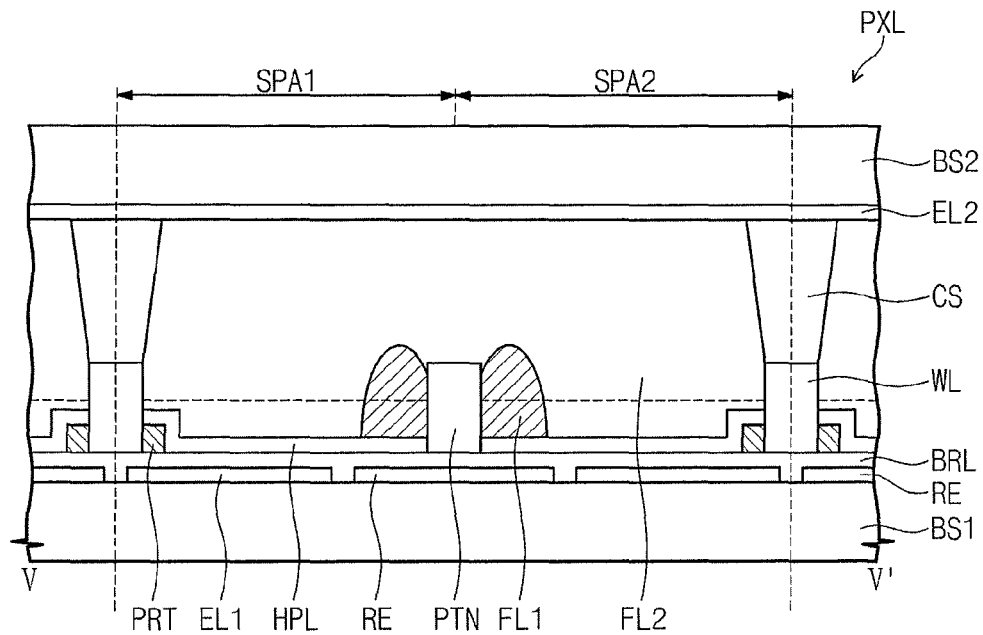
FIG. 6B is a cross-sectional view taken along a line V-V' indicated in FIG. 6A.

FIG. 6A is a plan view illustrating an electrowetting display device according to one or more embodiments of the present invention, and FIG. 6B is a cross-sectional view taken along a line V-V' indicated in FIG. 6A. FIGS. 6A and 6B illustrate that at least a protrusion is positioned adjacent to the barrier wall WL and/or contacts the barrier wall WL. In FIGS. 6A and 6B, the same reference numerals may denote elements that are analogous to or identical to elements illustrated in FIGS. 3A and 3B, and thus detailed descriptions of the analogous or identical elements may be omitted.

Referring to FIGS. 6A and 6B, the pixel PXL includes (a portion of) an array substrate, (a portion of) an opposite substrate, and electrowetting layer fluids, e.g., a first fluid FL1 and a second fluid FL2. The array substrate includes a first base substrate BS1, a first electrode EL1, a reference electrode RE, a switching device (not illustrated), a barrier wall WL, a partition wall PTN, a protrusion PRT, and a hydrophobic layer HPL. A barrier layer BRL is provided between the first base substrate BS1 and the hydrophobic layer HPL and between the first base substrate BS1 and the barrier wall WL. The opposite substrate includes a second base substrate BS2, a second electrode EL2, and a column spacer CS. The first electrode EL1, the reference electrode RE, the switching device, and the second electrode EL2 may serve as an electronic device configured to drive the electrowetting layer fluids FL1 and FL2.

The protrusion PRT may protrude from the barrier layer BRL and/or may be disposed on the barrier layer BRL, as illustrated in FIG. 6B. A protrusion PRT is disposed in each sub-pixel area and is disposed adjacent to the barrier wall WL corresponding to the short sides of the pixel area PA. The protrusion PRT may contact with barrier wall WL or may be integrally formed with the barrier wall WL. As illustrated in FIG. 6A, the protrusion PRT extends parallel to at least a portion of the barrier wall WL.

The protrusion PRT has a height lower than that of the first fluid FL1 when the first fluid FL1 substantially completely covers the first sub-pixel area SPA1 and the second sub-pixel area SPA2 while the pixel PXL is in the OFF-state. The hydrophobic layer HPL is disposed on the barrier layer BRL to cover the protrusion PRT. Accordingly, the protrusion HPL has a hydrophobic surface due to the hydrophobic layer HPL.

An electronic device is provided in each pixel PXL and applies an electric potential difference between the electrodes EL1 and EL2 to control the electrowetting layer fluids FL1 and FL2.

Among the parts of the electronic device, the first electrode EL1 and the reference electrode RE are disposed on the first base substrate BS1, and the second electrode EL2 is disposed on the second base substrate BS2.

The first electrode EL1 is disposed between the first base substrate BS1 and the hydrophobic layer HPL and covers a portion of the first sub-pixel area SPA1 and a portion of the second sub-pixel area SPA2.

The reference electrode RE is spaced from the first electrode EL1. In one or more embodiments, as illustrated in FIG. 6A, the reference electrode RE is spaced from the first electrode EL1 and is located in the opening formed through the first electrode EL1. The reference electrode RE is applied with the common voltage applied to the second electrode EL2.

When the pixel PXL is in the ON-state, a voltage different from the common voltage is applied to the first electrode EL1, and thus an electric potential difference occurs between the first electrode EL1 and the second electrode EL2 and between the first electrode EL1 and the reference electrode RE. The attraction force acts between the second fluid FL2 and the first electrode EL1, and the second fluid FL2 moves to the first electrode EL1 to push away the first fluid FL1. In the area in which the protrusion PRT is disposed, the second fluid FL2 may easily push away the first fluid FL1 since a distance between the second fluid FL2 and the surface of the protrusion PRT is short. Accordingly, the second fluid FL2 pushes away the first fluid FL1 from the area in which the protrusion PRT is formed (wherein the area may be referred to as a breaking point), and the first fluid FL1 moves to an area overlapping the reference electrode RE from the protrusion PRT. In order to precisely control the directions to which the fluids FL1 and FL2 move, breaking points may be spaced from the collection points in the sub-pixel areas. The pushed first fluid FL1 is gathered on the reference electrode RE and is adjacent to (and contacts) the partition wall PTN.

In an electrowetting display device having the structures discussed with reference to FIGS. 6A and 6B, movement and restitution of the fluids may be substantially efficient since the breaking points and the collection points of the fluids FL1 and FL2 are controlled using the protrusion PRT. Thus, the response speeds of the ON- and OFF-states of the pixel may be satisfactorily fast, and nonclosing of the first fluid FL1 may be prevented. Advantageously, reproducibility and quality of the displayed images may be satisfactory.

Figure 7:
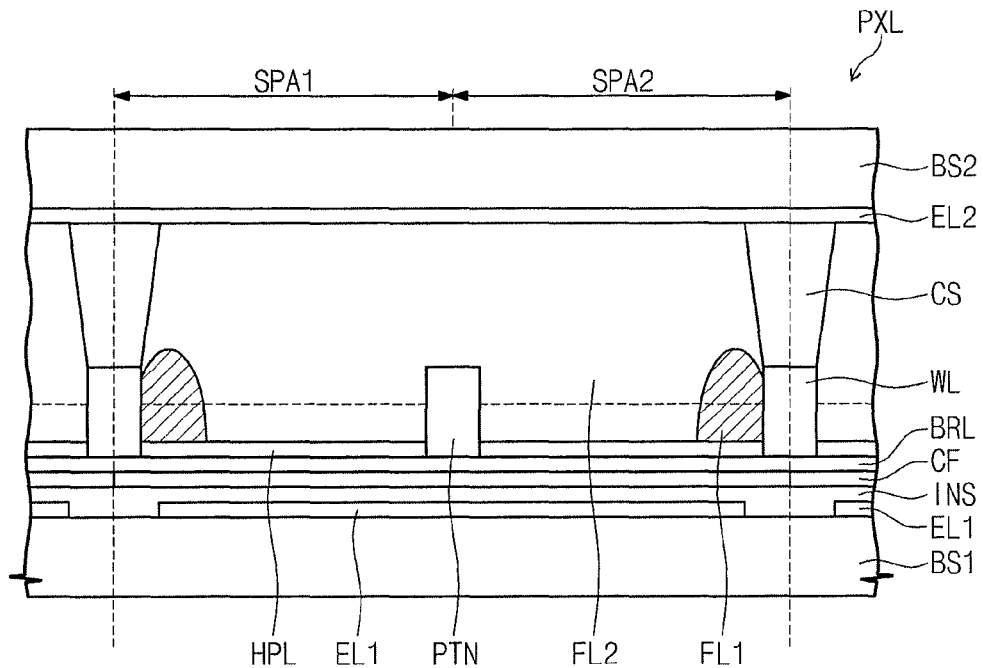
FIG. 7 is a cross-sectional view illustrating an electrowetting display device according to one or more embodiments of the present invention.

FIG. 7 is a cross-sectional view illustrating an electrowetting display device according to a one or more embodiments of the present invention, wherein the cross-sectional view may be taken along the line I-I' indicated in FIG. 1A.

Referring to FIG. 7, the pixel PXL includes (a portion of) an array substrate, (a portion of) an opposite substrate, and electrowetting layer fluids FL1 and FL2, e.g., a first fluid FL1 and a second fluid FL2. The array substrate includes a first base substrate BS1, a color filter CF, a first electrode EL1, a switching device (not shown), a barrier wall WL, a partition wall PTN, and a hydrophobic layer HPL. An insulating layer INS is disposed between the first base substrate BS1 and the color filter CF, and a barrier layer BRL is disposed between the color filter CF and the hydrophobic layer HPL and between the color filter CF and the barrier wall WL.

The opposite substrate includes a second base substrate BS2, a second electrode EL2, and a column spacer CS. The first electrode EL1, the switching device, and the second electrode EL2 may serve as an electronic device configured to drive the electrowetting layers FL1 and FL2.

The color filter CF is used to enable the pixel PXL to display a color. In one or more embodiments, the color filter CF may have one of a red color, a green color, and a blue color. In one or more embodiments, the color filter CF may have one of various colors other than red, green, and blue. In one or more embodiments, the color filter may have a white color. A white W color that transmits all wavelengths of the white light passing therethrough may be used to improve brightness, and the color filter CF may have one or the red color, the green color, the blue color, and the white color. In one or more embodiments, the color filter CF may have on of a yellow color, a cyan color, and a magenta color. The yellow color, the cyan color, the magenta color may be used in addition to the red, green, blue, and white colors or may be used instead of at least one of the red, green, blue, or white color.

Pixels corresponding to the red color filters, pixels corresponding to the green color filters, pixels corresponding to the blue color filters, and pixels corresponding to the white color filters are referred to as red pixels RP, green pixels GP, blue pixels BP, and whit pixels WP, respectively. One of the red pixels RP, one of the green pixels GP, one of the blue pixels BP, and one of the white pixels WP may form a pixel unit PU, which is a minimum unit for displaying a color image. The electrowetting display device may include a plurality of pixel units PU arranged in a matrix form for displaying color images that may be perceived by a viewer.

In a pixel unit PU, the red pixel RP, the green pixel GP, the blue pixel BP, and the white pixel WP may be arranged in one of various ways. The position of the partition wall may depend on the arrangement of the color pixels.

Figure 8A:
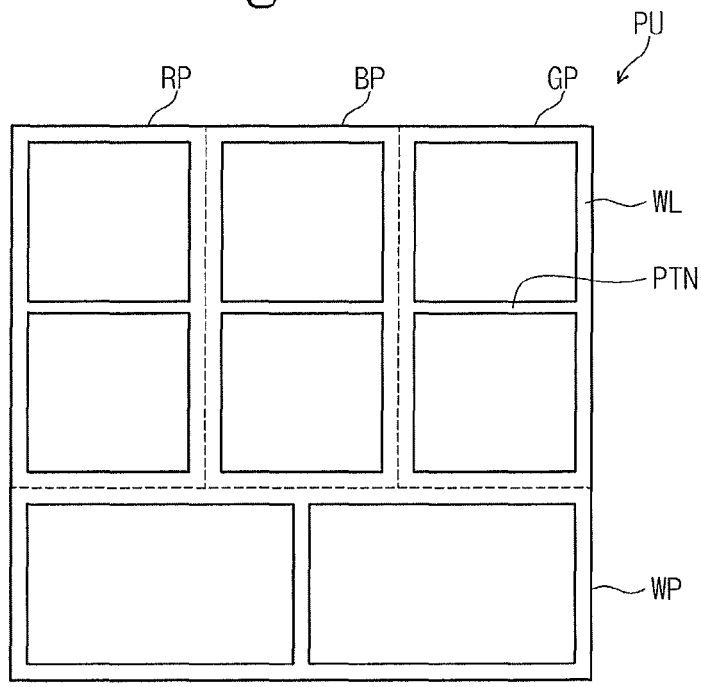
FIGS. 8A to 8C are plan views illustrating arrangements of pixels and positions of a partition wall.
Figure 8B:
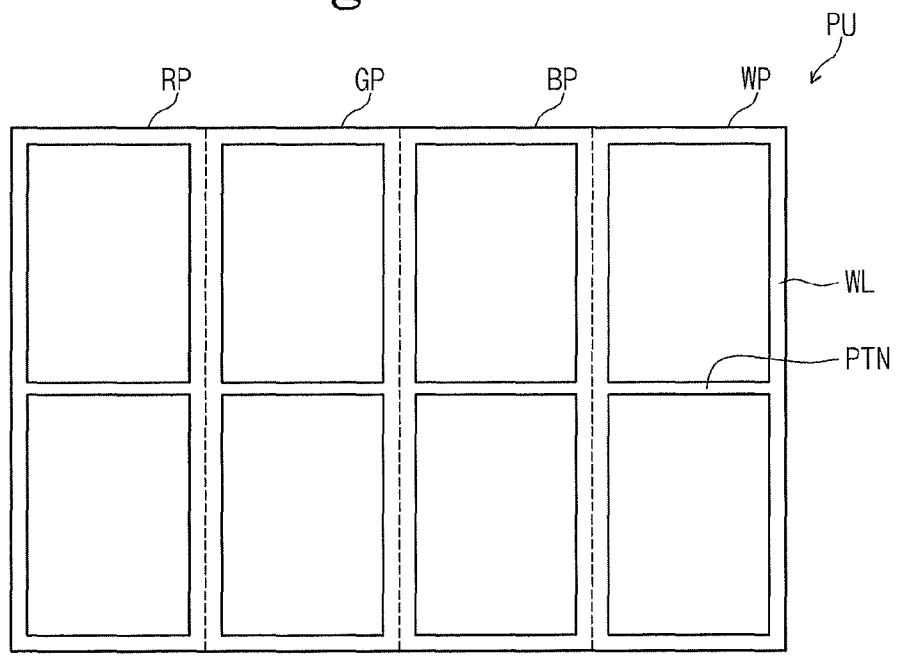
Figure 8C:
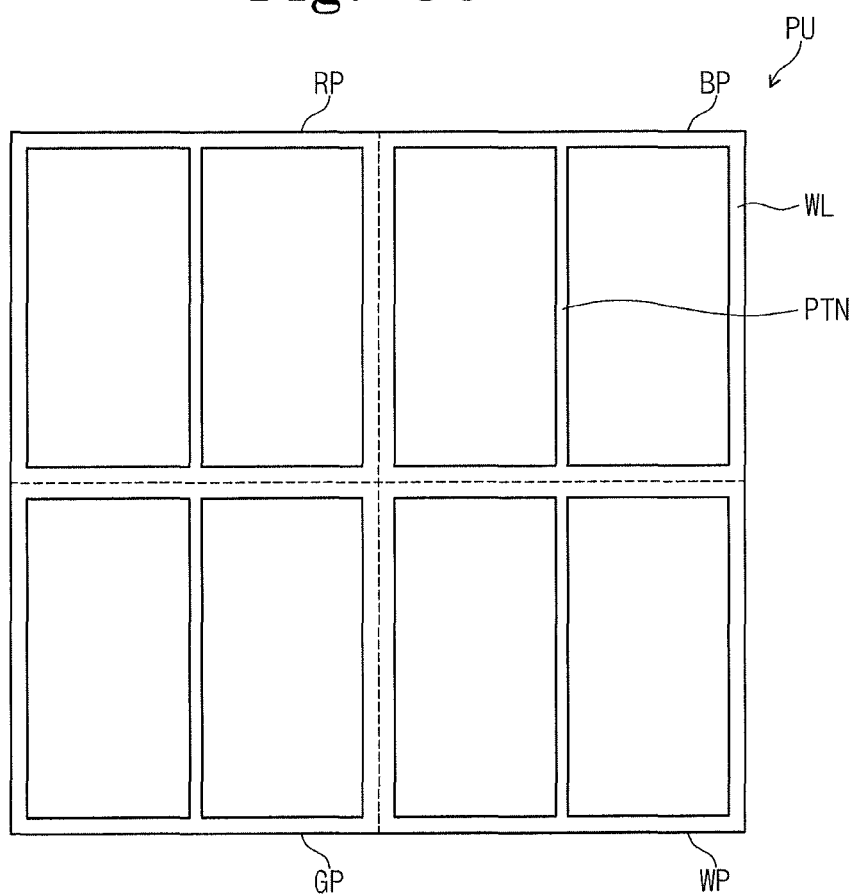

FIGS. 8A to 8C are plan views illustrating arrangements of pixels and positions of the partition wall. For the convenience of explanation, one pixel unit PU has been illustrated in each of FIGS. 8A to 8C.

Referring to FIG. 8A, the red pixel RP, the green pixel GP, the blue pixel BP, and the white pixel WP are arranged in two rows. The red pixel RP, the green pixel GP, and the blue pixel BP are arranged in a first row, and the white pixel WP is arranged in a second row. The red pixel RP, the green pixel GP, and the blue pixel BP extend in a column direction and are arranged in a row direction. The white pixel WP extends in the row direction. In each of the red pixel RP, the green pixel GP, the blue pixel BP, and the white pixel WP, a partition wall PTN extends in a direction substantially vertical to the direction in which the red pixel RP, the green pixel GP, the blue pixel BP, and the white pixel WP extend. That is, the partition wall PTN in each of the red pixel RP, the green pixel GP, and the blue pixel BP extends in the row direction. The partition wall PTN in the white 5 pixel WP extends in the column direction.

Referring to FIG. 8B, the red pixel RP, the green pixel GP, the blue pixel BP, and the white pixel WP are arranged in a matrix form of one row by four columns. The red pixel RP, the green pixel GP, the blue pixel BP, and the white pixel WP extend in the column direction and are sequentially arranged in the row direction. In each of the red pixel RP, the green pixel GP, the blue pixel BP, and the white pixel WP, a partition wall PTN extends in the row direction substantially vertical to the direction in which the red pixel RP, the green pixel GP, the blue pixel BP, and the white pixel WP extend.

Referring to FIG. 8C, the red pixel RP, the green pixel GP, the blue pixel BP, and the white pixel WP are arranged in a matrix form of two rows by two columns. The red pixel RP and the blue pixel BP are arranged in a first row, and the green pixel GP and the white pixel WP are arranged in a second row. In one or more embodiments, each of the red pixel RP, the green pixel GP, the blue pixel BP, and the white pixel WP has a square shape, and the partition wall PTN in each of the pixels extends in the column or row direction to be substantially in parallel to one of sides of the corresponding one of the red pixel RP, the green pixel GP, the blue pixel BP, and the white pixel WP.

Figure 9A:
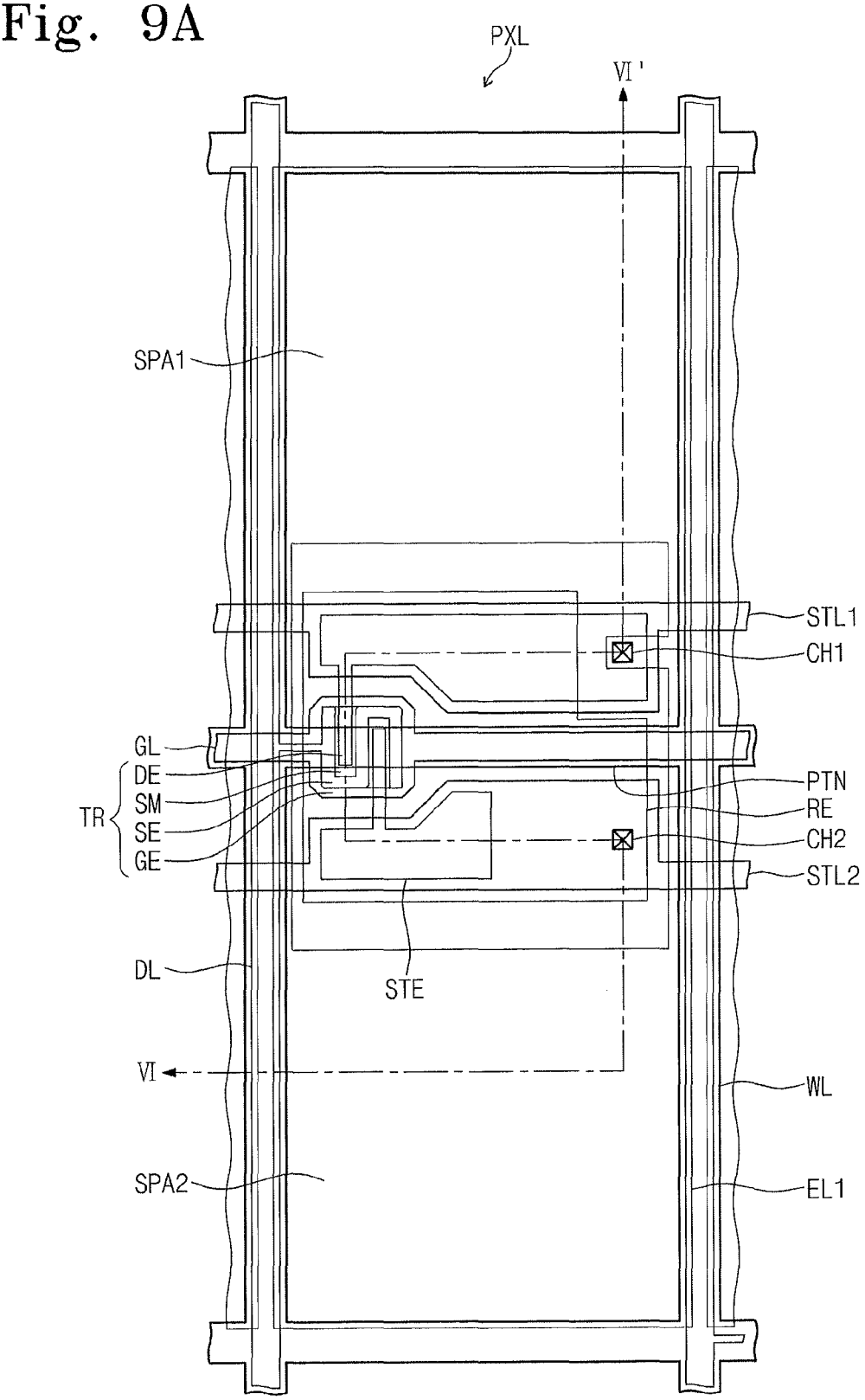
FIG. 9A is a plan view illustrating an electrowetting display device in further detail according to one or more embodiments of the present invention.
Figure 9B:
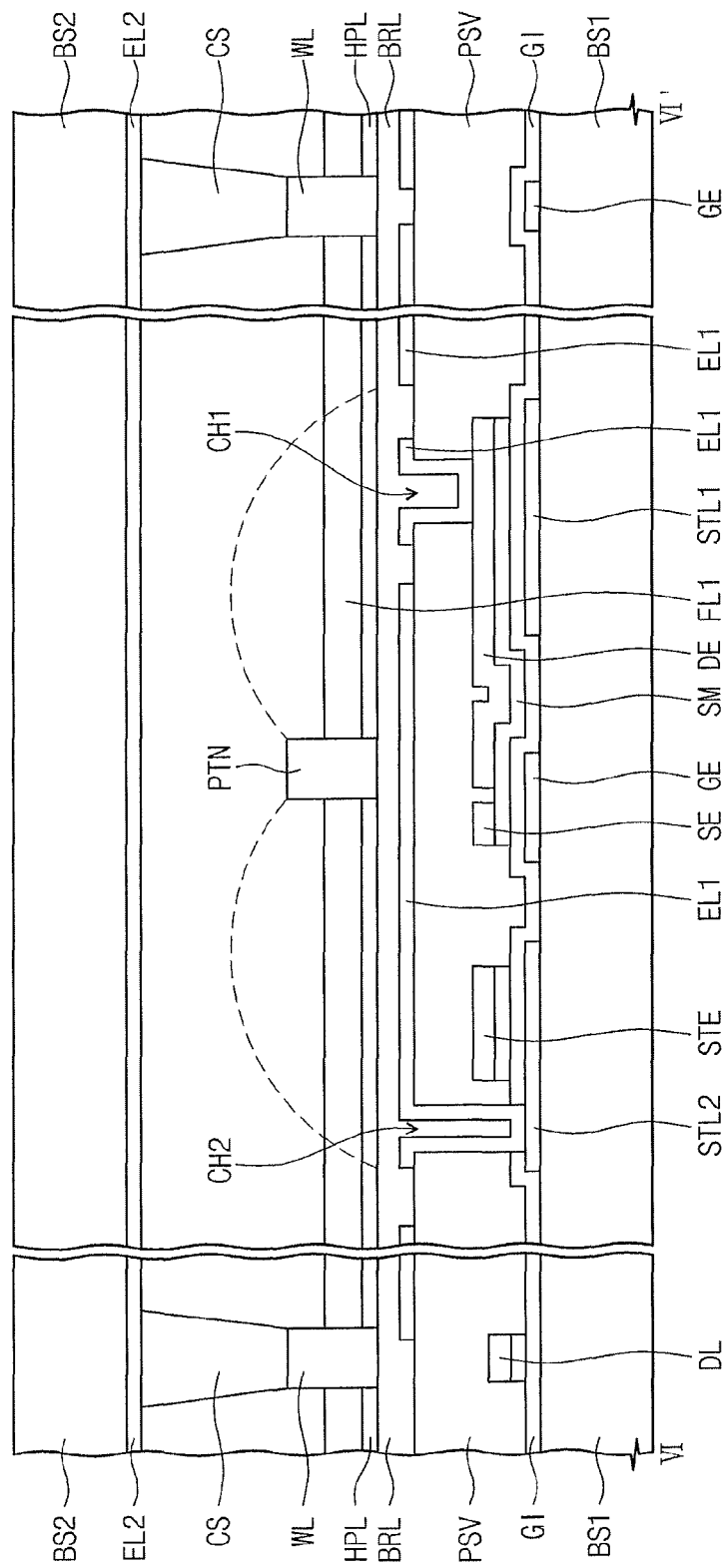
FIG. 9B is a cross-sectional view taken along a line VI-VI' indicated in FIG. 9B.

FIG. 9A is a plan view illustrating the electrowetting display device in further detail according to one or more embodiments of the present invention, and FIG. 9B is a cross-sectional view taken along a line VI-VI' indicated in FIG. 9B. The electrowetting display device discussed with reference to FIGS. 9A and 9B may have features and advantages that are analogous to or identical to the electrowetting display device discussed with reference to FIGS. 3A and 3B.

Referring to FIGS. 9A and 9B, the electrowetting display device includes the array substrate, the opposite substrate overlapping the array substrate, and the electrowetting layer fluids, e.g., the first fluid FL1 and the second fluid FL2, disposed between the array substrate and the opposite substrate.

The array substrate includes the first base substrate BS1, the line part, the first electrode EL1, the reference electrode RE, the switching device, the storage electrode STE, the barrier wall WL, the partition wall PTN, and the hydrophobic layer HPL.

The first base substrate BS1 has the rectangular shape with a pair of long sides and a pair of short sides.

The line part applies signals to the switching devices and includes a plurality of gate lines GL, a plurality of data lines DL, and a storage lines STL.

The gate lines GL extend in the row direction on the first base substrate BS1. The data lines DL extend in the column direction crossing the row direction. The data lines DL are disposed on the first base substrate BS1 on which the gate lines GL are disposed. A gate insulating layer GI is disposed between the gate lines GL and the data lines DL. The storage lines STL extend substantially in parallel to the gate lines GL and are spaced apart from the gate lines GL. Each storage line STL includes a first storage line STL1 and a second storage line STL2 adjacent to the first storage line STL1 with a corresponding gate line of the gate lines GL being disposed therebetween.

The switching device is connected to a corresponding one of the gate lines GL and a corresponding one of the data lines DL. The switching device may be, but not limited to, a transistor TR configured to include a gate electrode GE, a semiconductor layer SM, a source electrode SE, and a drain electrode DE.

The gate electrode GE protrudes from the corresponding gate line GL.

The semiconductor layer SM is disposed on the gate electrode GE with the gate insulating layer GI being disposed therebetween. The semiconductor layer SM is formed of one or more of oxide semiconductor, amorphous silicon semiconductor, and crystalline or polycrystalline silicon semiconductor. The gate insulating layer GI is formed on the first base substrate BS1 on which the gate line GL and the gate electrode are formed to cover the gate line GL and the gate electrode GE.

The semiconductor layer SM includes an active layer disposed on the gate insulating layer GI and an ohmic contact layer disposed on the active layer. The active layer overlaps the source electrode SE and the drain electrode DE and overlaps an area between the source electrode SE and the drain electrode DE. The ohmic contact layer is provided between the active layer and the source electrode SE and between the active layer and the drain electrode DE.

The source electrode SE is branched from the corresponding data line of the data line DL, and the drain electrode DE is spaced apart from the source electrode SE with the gate electrode GE being disposed therebetween. The source electrode SE and the drain electrode DE partially overlap the gate electrode GE. The drain electrode DE overlaps the first storage line STL1.

In one or more embodiments, the source electrode SE and the drain electrode DE overlap a portion of the semiconductor layer SM in an area except for the area between the source electrode SE and the drain electrode DE. The area between the source electrode SE and the drain electrode DE serves as a channel portion, and an upper surface of the active layer is exposed through the area between the source electrode SE and the drain electrode DE. When the transistor TR is turned on, a current may flow between the source electrode SE and the drain electrode DE through the channel portion.

A passivation layer PSV is disposed on the channel portion to cover the channel portion, so that the channel portion is protected by the passivation layer PSV.

The storage electrode STE overlaps the source electrode SE with the channel portion being disposed therebetween. When the transistor TR is turned on, the storage electrode STE is electrically connected to the source electrode SE through the channel portion. The storage electrode STE overlaps the second storage line STL2.

The first electrode EL1 is connected to the drain electrode DE through a first contact hole CH1 with the passivation layer PSV being disposed therebetween.

The first contact hole CH1 is formed through the passivation layer PSV, and a portion of the drain electrode DE is exposed through the first contact hole CHI. The first electrode EL1 is electrically connected to the exposed portion of the drain electrode DE.

The first electrode EL1 may be integrally formed as a single unitary unit and provided with a through opening, which corresponds to the area in which the partition wall PTN is formed.

The reference electrode RE is disposed in the opening. The reference electrode RE covers (or overlaps) the transistor TR and a portion of the first storage line STL1 and the second storage line STL2. The reference electrode RE is spaced from the first electrode EL1 and is connected to the second storage line STL2 through a second contact hole CH2 with the passivation layer PSV being disposed therebetween.

The second contact hole CH2 is formed through the passivation layer PSV and the gate insulating layer GI to expose a portion of the second storage line STL2. The reference electrode RE is electrically connected to the exposed portion of the second storage line STL2 through the second contact hole CH2.

The storage lines STL1 and STL2 are applied with the reference voltage. The reference voltage may be the same as the common voltage applied to the second electrode EL2.

Although not illustrated in FIGS. 9A and 9B, a color filter (not shown) may be disposed between the drain electrode DE and the passivation layer PSV. The color filter is used to enable the pixel to display a color. The color filter may have one or more features discussed with reference to FIGS. 7, 8A, 8B, and 8C.

The barrier layer BRL is disposed on the first base substrate BS1 on which the first electrode EL1 is formed. The barrier layer BRL prevents a portion of the electrowetting layer fluids FL1 and FL2, e.g., a material having a polarity or an electrical conductivity, from contacting the first electrode EL1 by diffusion or infiltration. This is to prevent the first electrode EL1 from being affected or damaged by the material having the polarity or the electrical conductivity in the electrowetting layer fluids FL1 and FL2.

The barrier wall WL and the partition wall PTN are disposed on the first base substrate BS1 on which the barrier layer BRL is formed. The barrier wall WL and the partition wall PTN may protrude with respect to the first base substrate BS1. A space surrounded by the first base substrate BS1 and the barrier wall WL is defined in each pixel area PA. The partition wall PTN partitions the pixels area PA into the sub-pixel areas, e.g., the sub-pixel areas SPA1 and SPA2, and restricts the movement of at least one of the first fluid FL1 or the second fluid FL2 in the sub-pixel areas SPA1 and SPA2.

The partition wall PTN may overlap a gate line GL, a portion of the barrier wall WL may overlap a data line DL, and a portion of the barrier wall WL may overlap a gate line GL.

The hydrophobic layer HPL covers (and/or overlaps) the pixel area PA of the first base substrate BS1.

The opposite substrate includes the second base substrate BS2 overlapping the first base substrate BS1 and includes the second electrode EL2.

The column spacer CS is disposed on the second base substrate BS2 and protrudes with respect to the second base substrate BS2. The column spacer CS is disposed at a position corresponding to the barrier wall WL to allow a contact surface thereof to directly contact the barrier wall WL, and thus the column spacer CS maintains a distance (or cell gap) between the first base substrate BS1 and the second base substrate BS2 in cooperation with the barrier wall WL.

Figure 10A:
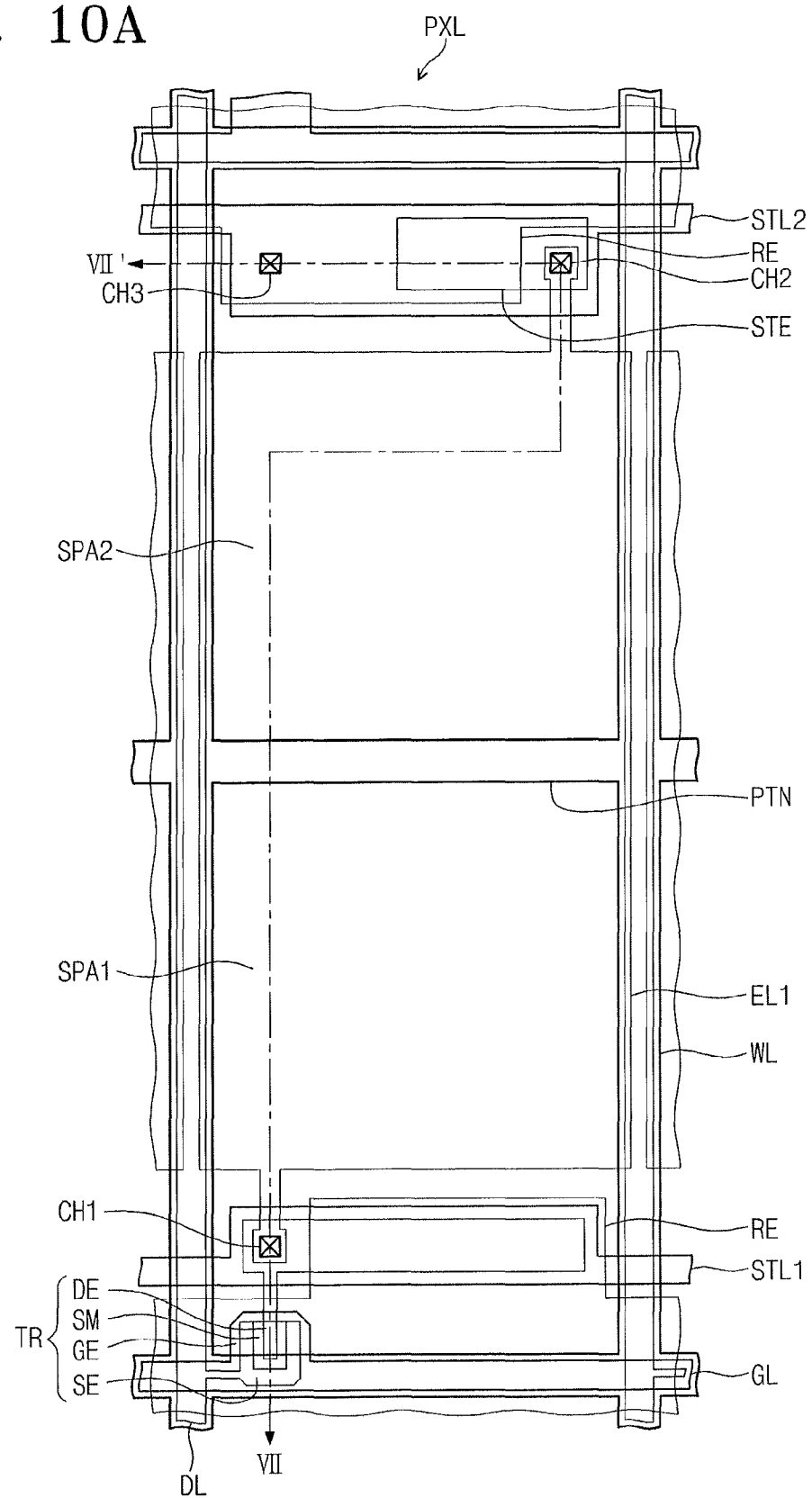
FIG. 10A is a plan view illustrating an electrowetting display device in further detail according to one or more embodiments of the present invention.

FIG. 10A is a plan view illustrating the electrowetting display device in further detail according to one or more embodiments of the present invention, and FIG. 10B is a cross-sectional view taken along a line VII-VII' indicated in FIG. 10B. The electrowetting display device discussed with reference to FIGS. 10A and 10B may have features and advantages that are analogous to or identical to the electrowetting display device discussed with reference to FIGS. 4A and 4B.

Referring to FIGS. 10A and 10B, the electrowetting display device includes the array substrate, the opposite substrate overlapping the array substrate, and the electrowetting layer fluids, e.g., the first fluid FL1 and the second fluid FL2 disposed between the array substrate and the opposite substrate.

The array substrate includes the first base substrate BS1, the line part, the first electrode EL1, the reference electrode RE, the switching device, the storage electrode STE, the barrier wall WL, the partition wall PTN, and the hydrophobic layer HPL.

The line part applies signals to the switching devices and includes a plurality of gate lines GL, a plurality of data lines DL, and a storage lines STL.

The gate lines GL extend in the row direction on the first base substrate BS1.

The data lines DL extend in the column direction crossing the row direction. The data lines DL are disposed on the first base substrate BS1 on which the gate lines GL are disposed with the gate insulating layer GI being disposed between the gate lines GL and the data lines DL.

The storage lines STL extend substantially in parallel to the gate lines GL and spaced apart from the gate lines GL. Each storage line STL includes the first storage line STL1 and the second storage line STL2 adjacent to the first storage line STL1 with a corresponding gate line of the gate lines GL being disposed therebetween. The first storage line STL1 is disposed adjacent to the gate line of a present stage, and the second storage line STL2 is disposed adjacent to the gate line of a previous stage. The first storage line STL1 and the second storage line STL2 are spaced from each other with the corresponding gate line GL being disposed therebetween.

The switching device is connected to a corresponding one of the gate lines GL and a corresponding one of the data lines DL. The switching device may be, but not limited to, a transistor TR configured to include a gate electrode GE, a semiconductor layer SM, a source electrode SE, and a drain electrode DE.

The gate electrode GE protrudes from the corresponding gate line GL.

The semiconductor layer SM is disposed on the gate electrode GE with the gate insulating layer GI being disposed therebetween. The semiconductor layer SM is formed of one or more of oxide semiconductor, amorphous silicon semiconductor, and crystalline or polycrystalline silicon semiconductor. The gate insulating layer GI is formed on the first base substrate BS1 on which the gate line GL and the gate electrode are formed to cover the gate line GL and the gate electrode GE.

The semiconductor layer SM includes an active layer disposed on the gate insulating layer GI and an ohmic contact layer disposed on the active layer. The active layer overlaps the source electrode SE and the drain electrode DE and overlaps an area between the source electrode SE and the drain electrode DE. The ohmic contact layer is provided between the active layer and the source electrode SE and between the active layer and the drain electrode DE.

The source electrode SE is branched from the corresponding data line of the data line DL and the drain electrode DE is spaced apart from the source electrode SE with the gate electrode GE being disposed therebetween. The source electrode SE and the drain electrode DE partially overlap the gate electrode GE. The drain electrode DE overlaps the first storage line STL1.

In one or more embodiments, the source electrode SE and the drain electrode DE overlap a portion of the semiconductor layer SM in an area except for the area between the source electrode SE and the drain electrode DE. The area between the source electrode SE and the drain electrode DE serves as a channel portion, and an upper surface of the active layer is exposed through the area between the source electrode SE and the drain electrode DE. When the transistor TR is turned on, a current may flow between the source electrode SE and the drain electrode DE through the channel portion.

A passivation layer PSV is disposed on the channel portion to cover the channel portion, so that the channel portion is protected by the passivation layer PSV.

The storage electrode STE floats on (and overlaps) the gate insulating layer GI and overlaps the second storage line STL2.

The first electrode EL1 is connected to the drain electrode DE through a first contact hole CH1 with the passivation layer PSV being disposed therebetween. The first electrode EL1 is connected to the storage electrode STE through a second contact hole CH2 with the passivation layer PSV being disposed therebetween.

The first contact hole CH1 is formed through the passivation layer PSV, and the portion of the drain electrode DE is exposed through the first contact hole CH1. The first electrode EL1 is electrically connected to the exposed portion of the drain electrode DE.

The second contact hole CH2 is formed through the passivation layer PSV, and a portion of the storage electrode STE is exposed through the second contact hole CH2. The first electrode EL1 is electrically connected to the exposed portion of the storage electrode STE.

The first electrode EL1 may be integrally formed as a single unitary unit. The first electrode EL1 is not disposed at two end portions of the pixel area PA in the longitudinal direction (or the length direction of the pixel area PA), and thus the first electrode EL1 is spaced from the barrier wall.

The reference electrode RE is disposed to be spaced apart from the first electrode EL1. The reference electrode RE is spaced apart from both end portions of the first electrode EL1 in the longitudinal direction, overlaps the barrier wall WL, and overlaps the portion of the next pixel area PA. The reference electrode RE is electrically connected to the second storage line STL2 through a third contact hole CH3.

The third contact hole CH3 is formed through the passivation layer PSV and the gate insulating layer GI to expose a portion of the second storage line STL2. The reference electrode RE is connected to the exposed portion of the second storage line STL2 through the third contact hole CH3.

The storage lines STL1 and STL2 are applied with the reference voltage. The reference voltage may be the same as the common voltage applied to the second electrode EL2.

Although not illustrated in FIGS. 10A and 10B, a color filter (not shown) may be disposed between the drain electrode DE and the passivation layer PSV.

The barrier layer BRL is disposed on the first base substrate BS1 on which the first electrode EL1 is formed. The barrier layer BRL prevents a portion of the electrowetting layer fluids FL1 and FL2, e.g., a material having a polarity or an electrical conductivity, from contacting the first electrode EL1 by diffusion or infiltration.

The barrier wall WL and the partition wall PTN are disposed on the first base substrate BS1 on which the barrier layer BRL is formed. The barrier wall WL and the partition wall PTN may protrude with respect to the first base substrate BS1. A space surrounded by the first base substrate BS1 and the barrier wall WL is defined in each pixel area PA. The partition wall PTN partitions the pixels area PA into the sub-pixel areas, e.g., the sub-pixel areas SPA1 and SPA2, and restricts the movement of at least one of the first fluid FL1 or the second fluid FL2 in the sub-pixel areas SPA1 and SPA2.

The partition wall PTN is disposed on the first electrode EL1. A portion of the barrier wall WL overlaps the gate line GL adjacent to the pixel PXL, and another portion of the barrier wall WL overlaps the data line DL adjacent to the pixel PXL.

The hydrophobic layer HPL covers (and/or overlaps) the pixel area PA of the first base substrate BS1.

The opposite substrate includes the second base substrate BS2 overlapping the first base substrate BS1 and includes the second electrode EL2.

The column spacer CS is disposed on the second base substrate BS2 and protrudes with respect to the second base substrate BS2. The column spacer CS is disposed at a position corresponding to the barrier wall WL to allow a contact surface thereof to directly contact the barrier wall WL, and thus the column spacer CS maintains a distance (or cell gap) between the first base substrate BS1 and the second base substrate BS2 in cooperation with the barrier wall WL.

In the electrowetting display devices illustrated in FIGS. 9A, 9B, 10A, and 10B, a data voltage applied to the first electrode (while the switching device is operated) is transmitted by the data line. When the gate signal is applied to the gate line, the transistor is turned on, and the data voltage applied to the data line is applied to the first capacitor and the second capacitor. After the data voltage is applied to the first electrode, the data voltage remains in the capacitors for a predetermined time period due to the coupling capacitance of each of the electrowetting capacitor and the storage capacitor so as to maintain the state of the pixel until the data voltage is refreshed. Here, the storage capacitor includes a capacitor formed by the drain electrode, the insulating layer, and the first storage line, a capacitor formed by the storage electrode, the insulating layer, and the second storage line, and a capacitor formed by the storage electrode, the passivation layer, and the reference electrode.

In one or more embodiments, the electrowetting display device is a transmission type electrowetting display device, and the collection point of the first fluid may be controlled to be disposed on the area in which the transistor and the storage line are formed so as to provide satisfactory transmittance. An electric field may be generated by the transistor, and the movement of the first fluid may be disturbed by the electric field if the electric field is not blocked. According to the one or more embodiments, the reference electrode is disposed on the area in which the transistor is formed, and thus the electric field is blocked. Thus, satisfactory transmittance may be provided without reduction of aperture ratio, and the first fluid is prevented from malfunctioning Advantageously, satisfactory image display quality may be provided.

Although the embodiments of the present invention have been described, it is understood that the present invention should not be limited to these embodiments. Various changes and modifications can be made by one ordinary skilled in the art within the spirit and scope of the present invention as hereinafter claimed.

For instance, the first electrode and the second electrode are respectively disposed on the first base substrate and the second base substrate in the example electrowetting display devices, but they should not be limited thereto or thereby. In one or more embodiments, the first electrode and the second electrode may be both disposed on only one of the first base substrate and the second base substrate. In one or more embodiments, the first electrode and the second electrode may have one or more shapes that are different from the shapes discussed in the example embodiments.

Although the embodiments of the present invention have been individually described, features of the embodiments may be combined unless their coexistence is impossible.

What is claimed is:

1. An electrowetting display device comprising:
   a first substrate and a second substrate;
   a first pixel and a second pixel between the first substrate and the second substrate, wherein the first pixel and the second pixel each include pixel portions, and wherein each pixel portion includes a first fluid and a second fluid immiscible with the first fluid, the second fluid having an electrical conductivity or a polarity;
   pixel walls disposed on the first substrate and at least partially separating the pixel portions from one another;
   a first electrode disposed on the first substrate, wherein the first electrode is electrically coupled to the pixel portions of the first pixel;
   a second electrode disposed on the first substrate, wherein the second electrode is electrically coupled to the pixel portions of the second pixel; and
   a third electrode disposed on the second substrate, wherein the third electrode is electrically coupled to the pixel portions of the first pixel and the second pixel.

2. The electrowetting display device of claim 1, further comprising:
   an electronic driving device configured to provide voltages to the pixel portions of the first pixel and the second pixel via the first electrode, the second electrode, and the third electrode, wherein the third electrode is configured to apply a common voltage to generate an electric field in cooperation with the first electrode or the second electrode.

3. The electrowetting display device of claim 1, wherein each of the pixel portions occupies a rectangular shaped area, and wherein the pixel walls are substantially parallel to one of four sides of the rectangular shaped areas of the pixel portions.

4. The electrowetting display device of claim 3, further comprising a barrier wall that partitions the first pixel from the second pixel, wherein at least one pixel portion of the first pixel and at least one pixel portion of the second pixel are adjacent to one another and partitioned from each other by the barrier wall.

5. The electrowetting display device of claim 3, wherein the first fluid in each of the pixel portions are identical to one another.

6. The electrowetting display device of claim 1, wherein the third electrode overlaps at least a portion of the pixel walls when viewed in a plan view.

7. The electrowetting display device of claim 1, further comprising a barrier wall that partitions the first pixel from the second pixel, wherein the third electrode overlaps at least a portion of the barrier wall when viewed in a plan view.

8. The electrowetting display device of claim 1, further comprising:
   a switching device in each of the first pixel and the second pixel;
   gate lines extending in a first direction and being capable of providing a gate voltage to gate electrodes of the switching device in each of the first pixel and the second pixel; and
   data lines extended in a second direction substantially perpendicular to the first direction and being capable of providing a data voltage to source electrodes of the switching device in each of the first pixel and the second pixel.

9. The electrowetting display device of claim 8, wherein the gate lines overlap at least a portion of the pixel walls when viewed in a plan view.

10. The electrowetting display device of claim 8, further comprising a first storage line extending in the first direction and spaced apart from the gate lines to form a capacitor together with a drain electrode of the switching device.

11. The electrowetting display device of claim 10, further comprising a second storage line disposed adjacent to the first storage line, wherein the first storage line or the second storage line is connected to the third electrode.

12. The electrowetting display device of claim 1, wherein at least a portion of the pixel walls are hydrophilic.

13. The electrowetting display device of claim 1, further comprising:
a barrier layer disposed on the first substrate; and
a protrusion disposed on the barrier layer in each of the pixel portions, wherein the protrusion protrudes upward from the first substrate.

14. The electrowetting display device of claim 13, wherein the protrusion overlaps with at least a portion of the pixel walls.

15. The electrowetting display device of claim 14, wherein the protrusion is integrally formed with at least a portion of the pixel walls.

16. The electrowetting display device of claim 1, further comprising:
a first color filter in the first pixel that covers all of the pixel portions of the first pixel; and
a second color filter in the second pixel that covers all of the pixel portions of the second pixel.

17. An electrowetting display device comprising:
a first substrate and a second substrate;
a first pixel and a second pixel separated from each other by first pixel walls on the first substrate, wherein the first pixel is partitioned by second pixel walls into two or more first pixel portions and the second pixel is partitioned by the second pixel walls into two or more second pixel portions, and wherein the first pixel and the second pixel each include a first fluid and a second fluid immiscible with the first fluid, the second fluid having an electrical conductivity or a polarity;
a first electrode disposed on the first substrate, wherein the first electrode is electrically coupled to the first pixel portions;
a second electrode disposed on the first substrate, wherein the second electrode is electrically coupled to the second pixel portions; and
a third electrode disposed on the second substrate, wherein the third electrode is electrically coupled to the first and the second pixel portions.

18. The electrowetting display device of claim 17, further comprising:
a barrier layer disposed on the first substrate; and
a protrusion disposed on the barrier layer in each of the first and the second pixel portions, wherein the protrusion protrudes upward from the first substrate.

19. The electrowetting display device of claim 18, wherein the protrusion overlaps with at least a portion of the second pixel walls.

20. The electrowetting display device of claim 19, wherein the protrusion is integrally formed with at least a portion of the second pixel walls.

* * * * *